(12) United States Patent
DeSantis

(10) Patent No.: US 9,854,752 B2
(45) Date of Patent: *Jan. 2, 2018

(54) TREE REMOVAL DEVICE

(71) Applicant: Michael DeSantis, Cooper City, FL (US)

(72) Inventor: Michael DeSantis, Cooper City, FL (US)

(73) Assignee: Michael DeSantis, Cooper City, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,354

(22) Filed: May 11, 2016

(65) Prior Publication Data

US 2016/0286738 A1      Oct. 6, 2016

Related U.S. Application Data

(63) Continuation-in-part of application No. 14/542,282, filed on Nov. 14, 2014, now Pat. No. 9,363,955.

(60) Provisional application No. 62/009,976, filed on Jun. 10, 2014.

(51) Int. Cl.
| | |
|---|---|
| *A01G 23/06* | (2006.01) |
| *A01G 23/04* | (2006.01) |
| *E02F 3/96* | (2006.01) |
| *E02F 3/34* | (2006.01) |
| *E02F 3/32* | (2006.01) |

(52) U.S. Cl.
CPC ......... *A01G 23/043* (2013.01); *A01G 23/062* (2013.01); *E02F 3/325* (2013.01); *E02F 3/3414* (2013.01); *E02F 3/96* (2013.01); *E02F 3/963* (2013.01); *A01G 23/065* (2013.01)

(58) Field of Classification Search
CPC .... A01G 23/06; A01G 23/062; A01G 23/065; A01G 23/043; E02F 3/96; E02F 3/3414; E02F 3/325
USPC .................................... 37/301–303; 144/334
See application file for complete search history.

(56) References Cited

U.S. PATENT DOCUMENTS

| | | | | |
|---|---|---|---|---|
| 2,734,290 A | * | 2/1956 | Tuttle ..................... | A01B 43/00 172/448 |
| 2,934,109 A | | 4/1960 | Bles | |
| 2,966,180 A | * | 12/1960 | Bles ........................ | A01G 23/06 144/193.1 |
| 3,143,813 A | * | 8/1964 | Wells ...................... | A01G 23/06 144/34.1 |
| 3,461,927 A | * | 8/1969 | Funari ...................... | B27L 7/00 144/193.1 |
| 3,620,271 A | * | 11/1971 | Loyer ..................... | A01G 23/06 144/24.12 |
| 3,842,871 A | * | 10/1974 | Jureiwicz .................. | B27L 7/00 144/195.1 |
| 3,887,015 A | * | 6/1975 | Kelley ..................... | E02F 5/32 172/254 |

(Continued)

*Primary Examiner* — John G Weiss
(74) *Attorney, Agent, or Firm* — Michael R. Williams; Ade & Company Inc.; Kyle R. Satterthwaite

(57) ABSTRACT

A tree removal device configured for coupling on a working vehicle is usable for slicing tree roots. The working vehicle has a front element which is pivotal relative to a frame of the vehicle about a lateral axis in front of a forward end of the frame, thereby allowing a knife element of the tree removal device to be pivoted into the ground for performing a cutting action with a sharpened cutting edge so as to slice the tree roots.

21 Claims, 9 Drawing Sheets

(56) References Cited

U.S. PATENT DOCUMENTS

| | | | |
|---|---|---|---|
| 4,356,644 A * | 11/1982 | Harkness | A01G 23/06 172/448 |
| 6,035,562 A * | 3/2000 | Virnig | A01G 23/043 37/302 |
| 6,764,139 B1 | 7/2004 | Wortman | |
| 7,520,306 B1 | 4/2009 | Berge | |
| 7,610,698 B2 * | 11/2009 | May | A01G 23/062 144/24.12 |
| 2006/0156590 A1 * | 7/2006 | Capolupo | A01G 23/06 37/302 |
| 2011/0107623 A1 | 5/2011 | Neidlein | |
| 2014/0190043 A1 * | 7/2014 | Horton | A01G 23/062 37/302 |

* cited by examiner

TREE REMOVAL DEVICE

CROSS-REFERENCE TO RELATED APPLICATIONS

This application is a continuation-in-part of parent application U.S. patent application Ser. No. 14/542,282 filed Nov. 14, 2014, and granted as U.S. Pat. No. 9,363,955, on Jun. 14, 2016, which claims benefit under 35 USC 119(e) of U.S. Provisional Application Ser. No. 62/009,976, filed Jun. 10, 2014, the contents thereof are incorporated herein by reference.

FIELD OF THE INVENTION

The present invention relates to a tree removal device for use on a working vehicle which has at least one working arm mounted to a frame of the working vehicle. The tree removal device is usable by operating the working vehicle with the working arm(s) so as to slice roots of a tree in the ground, after which the tree may be removed from the ground for transplanting at another location.

BACKGROUND

The disclosed invention is a combination of a tree removal device and a working vehicle for coupling the device thereon, in which the combination is used for slicing tree roots. In one example, businesses involved in growing and breeding trees typically require the ability to transplant these trees for several reasons, which include moving a tree to a location with more favourable growing conditions or moving a tree because it has outgrown its current space. In a tree nursery setting, the arrangement of the trees makes transplantation especially problematic and difficult due to the relatively close spacing of the trees, which is in the range of eight to ten feet. The need to replant the tree after removing it from its current location requires that neither the tree trunk, branches, nor root ball are damaged during the removal process. The root ball is a conglomerate of the tree roots and soil between the roots.

Prior art examples describing tree removal devices include U.S. Pat. No. 7,520,306 to Berge; U.S. Pat. No. 2,934,109 to Bles; U.S. Pat. No. 6,764,139 given to Wortman; and U.S. Patent Publication No. 2011/0107623 to Neidlein. The tree removal devices described by these patents have some drawbacks, however.

Firstly, the prior patents do not remove trees in such a manner that preserves same for transplantation. The patent given to Berge describes a tree knife tool used on a skid steer, which has serrated edges to cut roots and a tip that may be used to topple trees. While the serrated edges are able to cut tree roots, this cutting action destroys the roots. Furthermore, toppling the tree after cuttings its roots, which is the intended function of the tree knife tip, could potentially damage the branches and trunk of the tree. As such, the structure of Berge's tree knife is not intended to cut tree roots and remove trees so that the trees may be replanted. In addition, Wortman's patent describes a demolition implement with a hook that can be used to cut or pull out roots; however, doing so would destroy these roots.

Secondly, the size of the devices described by some of the prior patents is too large to be used in a tree nursery setting without damaging tree trunks or branches. The patent given to Bles and the patent application for Neidlein describe inventions that rely on a vertical swinging motion to facilitate the cutting action of the devices. Such a swinging motion is not well suited to a tree nursery setting, where trees are spaced closely together and the need to avoid damaging trees may interfere with the swinging action that is the principle of operation of these devices.

SUMMARY OF THE INVENTION

According to one aspect of the invention there is provided a combination of a working vehicle and a tree removal device configured for coupling thereon such that the combination is arranged for slicing tree roots, the combination comprising:

the working vehicle having:
a frame with a forward end along a longitudinal axis of the working vehicle;
the frame forming a peripheral boundary of the vehicle that includes the forward end;
traction components coupled to the frame so as to be configured for moving the working vehicle across a support surface;
at least one working arm mounted to the frame and extending beyond the peripheral boundary thereof such that a free end of said at least one working arm is located in spaced relation to the frame;
a front element pivotally carried on the working arm at or adjacent the free end thereof such that the front element is pivotally movable relative to the frame about a lateral axis spaced from the frame;
the tree removal device including:
an attachment portion including:
a base frame coupled to the front element of the working vehicle in fixed relation thereto; and
an attachment arrangement on the base frame;
a knife element carried by the base frame via the attachment arrangement;
the knife element projecting outwardly from the base frame away from the front element such that a blade portion at or adjacent a free end of the knife element that is usable for slicing the tree roots is held at a position spaced outwardly of the working vehicle frame;
the blade portion having planar faces on either side facing generally in a laterally horizontal direction;
the blade portion having a perimeter edge joining the planar faces about their periphery at the free end of the knife element such that the planar faces are contiguous at the perimeter edge with at least a portion of said perimeter edge being sharpened so as to perform a cutting action on the tree roots when the working vehicle is operated.

For example, the working vehicle is a skid steer.

In another example, the working vehicle is an excavator which is typically of the compact or mini variety.

Thus the working vehicle is suited for movement about and between trees planted relatively close to one another in a row or a two-dimensional array as in for example a tree nursery or orchard.

However, in other arrangements the working vehicle may be a four-wheeled all-terrain vehicle (ATV) or passenger vehicle, such as a sports utility vehicle or crossover or truck, arranged so to include a working arm extending longitudinally of a frame thereof with a pivotal front element at the working arm's free end. In such arrangements, the working arm itself may or may not be pivotal (for example, by pivotal mounting on the vehicle frame). When the working arm is not pivotally movable relative to the vehicle frame, the arm is held in fixed relation thereto, and therefore in these arrangements the knife element is likely not able to be manipulated into as many positions and orientations relative to the frame of the working vehicle as in the examples of the skid steer or excavator, as the working arm is generally held at a constant height above the ground. Nevertheless, in the subject arrangements of this paragraph, there is still provided an ability for pivotal movement of the tree removal device for engaging the ground to perform the cutting action.

In the example of the skid steer, the working vehicle typically has a pair of working arms extending longitudinally of the frame on either side thereof that are pivotally mounted at or adjacent a rear end of the frame with the free ends of the working arms located at or adjacent the forward end of the skid steer frame.

Furthermore, in this example the front element of the skid steer typically forms a pair of hands joined by a cross-member bridging between the hands, as in a conventional skid steer.

In the example of the excavator, the working vehicle typically has a single working arm pivotally mounted at the peripheral boundary of the frame. Typically this single working arm comprises at least two sections which are for example hydraulically actuated for folding movement relative to one another, with a first section being connected at its lower end to the frame and a second section supporting the front element that is pivotally connected at its upper end to an upper end of the first section.

It will be appreciated that the peripheral boundary of the vehicle frame is not limited in a strictest sense to for example a structural frame of the vehicle but may include those features of the vehicle arranged at an outer periphery of the vehicle (for example in a protruding orientation or at a location such as at a forward end of the vehicle) so as to be in locations/positions adjacent the free end where such features could possibly obstruct movement of the free end of the respective working arm in its movement.

In one arrangement said at least a portion of the perimeter edge which is sharpened includes a forward edge extending from a position at or adjacent a top of the blade portion to a position at or adjacent a bottom of the blade portion in an upstanding plane transverse to the lateral axis.

Typically, the knife element is elongated in the direction in which it projects.

As such, typically the forward edge is at a distal end of the knife element relative to where the knife element is attached to the base frame by the attachment arrangement, which is at or adjacent a rear of the knife element.

In one arrangement the perimeter edge is sharpened along its length so as to be arranged for slicing the tree roots in a plurality of orientations of the blade portion.

Typically, the portion of the perimeter edge which is sharpened is a continuous length thereof such that any portion of the sharpened length of edge is not separated by a length of the perimeter edge which is not sharpened.

Preferably the perimeter edge is smooth so as to be free of serrations.

Typically the blade portion of the knife element lies in a flat upstanding plane.

That is, with the tree removal device attached to the working vehicle at the front element, the knife element is oriented in the flat upstanding plane so as to slice through the ground and roots beneath the surface thereof similar to an orientation and manner in which a conventional knife is used for slicing through for example a food item.

In one arrangement the knife element is arranged for pivotal motion about the longitudinal axis of the working vehicle relative to the base frame about an axis in a vertical plane containing the longitudinal axis of the working vehicle such that the vertical plane divides the working vehicle into symmetrical halves, the knife element being pivotable side to side between a left position and a right position.

In this arrangement there is provided a mechanical actuator arranged for providing the pivotal motion of the knife element between the left and right positions.

In one arrangement the attachment arrangement comprises a support member projecting outwardly from the base frame away from the front element of the working vehicle.

In this arrangement the knife element is preferably carried on the support member at a location thereon that is spaced from the base frame of the tree removal device.

This arrangement having the support member may be particularly advantageous in the instance that the working vehicle is a skid steer.

The support member acts to locate the knife in spaced relation relative to the base frame and frame of the working vehicle where the blade portion is visible to an operator in the working vehicle.

Additionally, in this position the blade portion may reach farther forwardly of the front element when the tree removal device is pivoted into an orientation engaging the ground. Thus, the operator of the working vehicle may in one series of passes on one side of the tree slice all of the roots to said one side of the tree such that repositioning the working vehicle to an opposite spot but on the same side of the tree is not required in order to completely slice all of the roots on that same side.

In one arrangement the base frame comprises opposite top and bottom cross members extending laterally of the base frame and two laterally opposite side members spanning between the top and bottom cross members with the support member extending from the bottom cross member upwardly beyond the top cross member.

Typically the support member is supported in fixed position to the base fame relative to the lateral axis such that the support member is movable in fixed relation with the base frame about the lateral axis.

Typically the knife element is supported in fixed position relative to the attachment arrangement.

Therefore the knife element is movable in fixed relation with the attachment arrangement about the lateral axis.

The attachment arrangement may include a receptacle receiving the knife element therein such that knife elements having different shapes of blade portions are interchangeable on the support member.

For example, the receptacle is formed by a pair of parallel plates which are at spaced positions of one another with respect to the lateral axis.

This includes arrangements both with and without the support member, where those without the support member have the knife element attached at the base frame by the attachment arrangement (wherein the knife element is not wholly spaced from the base frame).

Typically the knife element is held in butting engagement with a closed bottom of the receptacle.

Alternatively to the receptacle, in other arrangements the attachment arrangement comprises weld beads holding the knife element fixedly to the base frame thereat.

The base frame may be planar and oriented laterally to the working vehicle.

For example, in the arrangement having the skid steer as the working vehicle, the base frame comprises for example the top and bottom cross-members and the laterally opposite side members all of which define a common plane.

Additionally, for example in the arrangement having the excavator as the working vehicle, the base frame comprises a plate which is planar.

According to another aspect of the invention there is provided a method of slicing roots of a tree in the ground in a manner such that the tree is transplantable comprising:
providing a working vehicle including:
a frame with a forward end along a longitudinal axis of the working vehicle;
the frame having a peripheral boundary, part of which is formed by the forward end;
traction components coupled to the frame so as to be configured for moving the vehicle in forward and backward directions; and
at least one working arm mounted to the frame and extending beyond the peripheral boundary thereof such that a free end of said at least one working arm is located in spaced relation to the frame;
a front element pivotally carried on the working arm at or adjacent the free end thereof such that the front element is pivotally movable relative to the frame about a lateral axis spaced from the frame;
providing a tree removal device which is configured for coupling to the front element of the working vehicle including:
an attachment portion configured for coupling to the front element of the working vehicle in fixed relation thereto;
a knife element carried on the attachment portion so as to project forwardly such that a blade portion at a free end of the knife element carrying a cutting edge for slicing the tree roots is held at a position forward of the frame of the working vehicle;
the knife element being carried so as to lie in a flat upstanding plane;
with the tree removal device coupled to the working vehicle:
a) inserting the blade portion of the tree removal device into the ground on one side of the tree where movement of the knife element into a ground engaging position therefor includes pivoting the knife element about said lateral axis using the front element of the working vehicle;
b) operating the working vehicle so as to move the knife element in at least one of the forward and backward directions to perform with the cutting edge of the knife element a cutting action in said at least one of the forward and backward directions for slicing the tree roots disposed on said side of the tree thereby forming a pass on said side of the tree;
c) repositioning the working vehicle to another side of the tree for repeating steps a) and b) so as to form a plurality of the passes about the tree to completely slice the tree roots such that the tree is removable from the ground in a condition where the tree is transplantable.

That is, in the ground engaging position the knife element at its blade portion is in the ground.

Thus, movement of the knife element into the ground engaging position includes at least use of the front element of the working vehicle which is arranged for pivotal movement.

In one arrangement, with regards to step a), inserting the blade portion of the tree removal device into the ground comprises pivoting the knife element into the ground using the front element of the working vehicle.

In some arrangements where the working arm(s) is mounted on the frame of the working vehicle in such a manner so as to be arranged for upward and downward movement of the free end relative to the vehicle frame, movement of the knife element into the ground engaging position may include use of the working arm(s) of the working vehicle for example to lower the free end thereof closer to the ground.

In one arrangement, with regards to step b), operating the working vehicle comprises moving the frame of the working vehicle using its traction components in at least one of the forward and backward directions so as to perform the cutting action in the respective direction of movement.

For example, in this arrangement the working vehicle is one of a skid steer, an all-terrain vehicle (ATV), and a passenger vehicle such as a truck or sport utility vehicle.

In one arrangement, the working arm of the vehicle is configured for movement between a retracted position in which the free end of the working arm is in proximity to the frame of the vehicle and an extended position in which the free end of the working arm is located further outwardly of the frame than in the retracted position, and wherein, in step b), operating the working vehicle comprises moving the working arm from one of the retracted position and the extended position to the other one of the retracted and extended positions so as to perform the cutting action in said at least one of the forward and backward directions.

For example, in this arrangement the working vehicle is an excavator with its working arm comprising at least two sections arranged for folding movement relative to one another such that the working arm is positionable between the extended and retracted positions, with a first section of the arm being connected at its lower end to the frame and a second section supporting the front element that is pivotally connected at its upper end to an upper end of the first section.

Typically each pass comprises a plurality of cutting actions including progressively inserting the blade portion deeper into the ground.

That is, one cutting action typically comprises maintaining the blade portion at a generally constant depth in the ground. Therefore more than one cutting action where each subsequent cutting action is performed at a greater depth beneath the surface of the ground may be required to completely slice those roots at the one side of the tree.

According to another aspect of the invention there is provided a combination of a tree removal device and a working vehicle configured for coupling the tree removal device thereon such that the combination is arranged for slicing tree roots. The working vehicle has a frame with a forward end along a longitudinal axis of the vehicle, laterally opposing traction components coupled to respective lateral sides of the frame and configured to move the vehicle in forward and backward directions, and a front element pivotably coupled at a forward-most end of the working vehicle such that the front element is arranged for pivotal motion relative to the working vehicle about a lateral axis in front of the forward end of the frame. Further, the combination comprises an attachment configured for coupling in fixed relation to the front element and a knife element having opposite blade and support portions, the support portion being coupled to the attachment such that the knife element extends generally forwards from the attachment and is arranged to be pivotable relative to the frame of the working vehicle about the lateral axis in front of the forward end of the frame. The blade portion has a front edge arranged for engaging the ground in the forward direction of movement of the working vehicle and a rear edge arranged for engaging the ground in the backward direction of movement of the working vehicle, wherein the front and rear edges are sharpened so as to perform a cutting action in the respective forward and backward directions of movement of the working vehicle.

The embodiment as described in more detail hereinafter provides a means of removing trees in such a manner that preserves them for transplantation because having sharpened those edges of the blade portion which engage the ground allows the cutting actions in both the forward and backward directions of movement of the working vehicle to facilitate a slice at a single location along the root, even if slicing a single root requires several forward and backward motions. As such, the cutting actions allow a root ball of the tree to be preserved.

Preferably, the blade portion of the knife element further comprises a top edge arranged for engaging the ground in the forward direction of movement of the working vehicle such that the top edge meets the front edge at an upper end thereof so as to form a forward-most tip at the forward-most end of the blade portion of the knife element when the blade portion is pivotally rotated for engaging the ground, the top edge being sharpened so as to perform a cutting action in conjunction with the front edge in the forward direction of movement.

Preferably, the blade portion of the knife element further comprises a bottommost edge arranged for engaging the ground in the backward direction of movement of the working vehicle such that the bottommost edge meets the rear edge at a lower end thereof so as to form a rear tip at the rearward-most end of the blade portion of the knife element when the blade portion is pivotally rotated for engaging the ground, the bottommost edge being sharpened so as to perform a cutting action in conjunction with the rear edge in the backward direction of movement. In some instances, the bottommost edge meets the front edge at a lower end thereof so as to form a bottom tip at the downward-most end of the blade portion of the knife element when the blade portion is pivotally rotated for engaging the ground such that the bottom tip is arranged for digging the ground in both the forward and backward directions of movement of the working vehicle.

The knife element may also be arranged for pivotal motion about the longitudinal axis of the working vehicle relative to the attachment about an axis in a vertical plane containing the longitudinal axis of the working vehicle such that the vertical plane divides the working vehicle into symmetrical halves, the knife element being pivotable between an extreme left position and an extreme right position. The combination further comprises a mechanical actuator arranged for providing the pivotal motion of the knife element between the extreme left position and the extreme right position.

It is preferred that the combination further comprises a support post arranged for coupling the support portion of the knife element to the attachment, and the attachment comprises an attachment frame having opposite top and bottom cross members and two laterally opposed side members spanning between the top and bottom cross members, the support post being coupled to the attachment frame so that the support post extends in a general upward direction from the bottom cross member. Preferably, the support post comprises a pair of plates spaced laterally about a center axis of the support post arranged for coupling the support portion of the knife element therein. the support post is arranged for pivotal motion about the longitudinal axis of the working vehicle relative to the attachment about an axis in a vertical plane containing the longitudinal axis of the working vehicle such that the vertical plane divides the working vehicle into symmetrical halves, the support post being pivotable between an extreme left position and an extreme right position. Preferably, the combination further comprises a mechanical actuator arranged for providing the pivotal motion of the support post between the extreme left position and the extreme right position.

According to another aspect of the invention there is provided a combination of a tree removal device and a working vehicle configured for coupling the tree removal device thereon such that the combination is arranged for slicing tree roots. The combination includes a working vehicle having a frame with a forward end along a longitudinal axis of the vehicle, laterally opposing traction components coupled to respective lateral sides of the frame and configured to move the vehicle in forward and backward directions, and a front element pivotably coupled at a forward-most end of the working vehicle such that the front element is arranged for pivotal motion relative to the working vehicle about a lateral axis in front of the forward end of the frame. Further, the combination comprises an attachment configured for coupling in fixed relation to the front element and a knife element having opposite blade and support portions, the support portion being coupled to the attachment such that the knife element extends generally forwards from the attachment and is arranged to be pivotable relative to the frame of the working vehicle about the lateral axis in front of the forward end of the frame, and the blade portion comprising at least one edge that is arranged to engage the ground in a respective at least one direction of movement of the working vehicle The combination also comprises a mechanical actuator arranged for coupling between the knife element and the attachment. Furthermore, the at least one edge is sharpened so as to perform a cutting action in the at least one direction of movement. Also, the knife element is arranged for pivotal motion relative to the attachment about an axis in a vertical plane containing the longitudinal axis of the working vehicle such that the vertical plane divides the working vehicle into symmetrical halves, the knife element being pivotable between an extreme left position and an extreme right position. Lastly, the mechanical actuator is arranged to provide the pivotal motion of the knife element between the extreme left position and the extreme right position.

The embodiment as described in more detail hereinafter describes a device that is able to avoid damaging the trunk and branches of the tree by providing a means of lateral adjustment of the knife element between two extreme positions. Tilting the knife element away from the center of the device permits the tree removal device to be used to slice the roots of trees whose trunks do not necessarily grow vertically, so as to prevent engagement of the tree trunk during a cutting action.

Preferably, the at least one edge of the blade portion is a front edge arranged for engaging the ground in the forward direction of movement of the working vehicle, the front edge being sharpened so as to perform the cutting action in the forward direction of movement of the working vehicle. It is preferred that the blade portion of the knife element further comprises a top edge arranged for engaging the ground in the forward direction of movement of the working vehicle such that the top edge meets the front edge at an upper end thereof so as to form a front tip at a forward-most end of the blade portion of the knife element when the blade portion is pivotally rotated for engaging the ground, the top edge being sharpened so as to perform the cutting action in conjunction with the front edge in the forward direction of movement.

Alternatively, it is preferred that the at least one edge of the blade portion is a rear edge arranged for engaging the ground in the backward direction of movement of the working vehicle, the rear edge being sharpened so as to perform the cutting action in the backward direction of movement of the working vehicle. Preferably, the blade portion of the knife element further comprises a bottommost edge arranged for engaging the ground in the backward direction of movement of the working vehicle such that the bottommost edge meets the rear edge at a lower end of the rear edge so as to form a rear tip at a rearward-most end of the blade portion of the knife element when the blade portion is pivotally rotated for engaging the ground, the bottommost edge being sharpened so as to perform the cutting action in conjunction with the rear edge in the backward direction of movement. In some instances, the blade portion of the knife element further comprises a front edge arranged for engaging the ground in the forward direction of movement of the working vehicle, and the bottommost edge meets the front edge at a lower end thereof so as to form a bottom tip at a downward-most end of the blade portion of the knife element when the blade portion is pivotally rotated for engaging the ground such that the bottom tip is arranged for digging the ground in both the forward and backward directions of movement of the working vehicle.

Preferably, the combination further comprises a support post arranged for coupling the support portion of the knife element to the attachment. The support post is arranged for pivotal motion about the longitudinal axis of the working vehicle relative to the attachment about the axis in the vertical plane containing the longitudinal axis of the working vehicle such that the vertical plane divides the working vehicle into symmetrical halves. The support post is pivotable between the extreme left position and the extreme right position in conjunction with the knife element when the support portion of the knife element is coupled in fixed relation to the support post. Furthermore, the attachment comprises an attachment frame having opposite top and bottom cross members and two laterally opposed side members spanning between the top and bottom cross members. The support post is coupled to the attachment frame so that the support post extends in a general upward direction from the bottom cross member. It is preferred that the support post comprises a pair of plates spaced laterally about a center axis of the support post arranged for coupling the support portion of the knife element therein.

BRIEF DESCRIPTION OF THE DRAWINGS

Preferred arrangements of the invention will now be described in conjunction with the accompanying drawings in which.

In the drawings like characters of reference indicate corresponding parts in the different figures.

DETAILED DESCRIPTION

Figure 1:
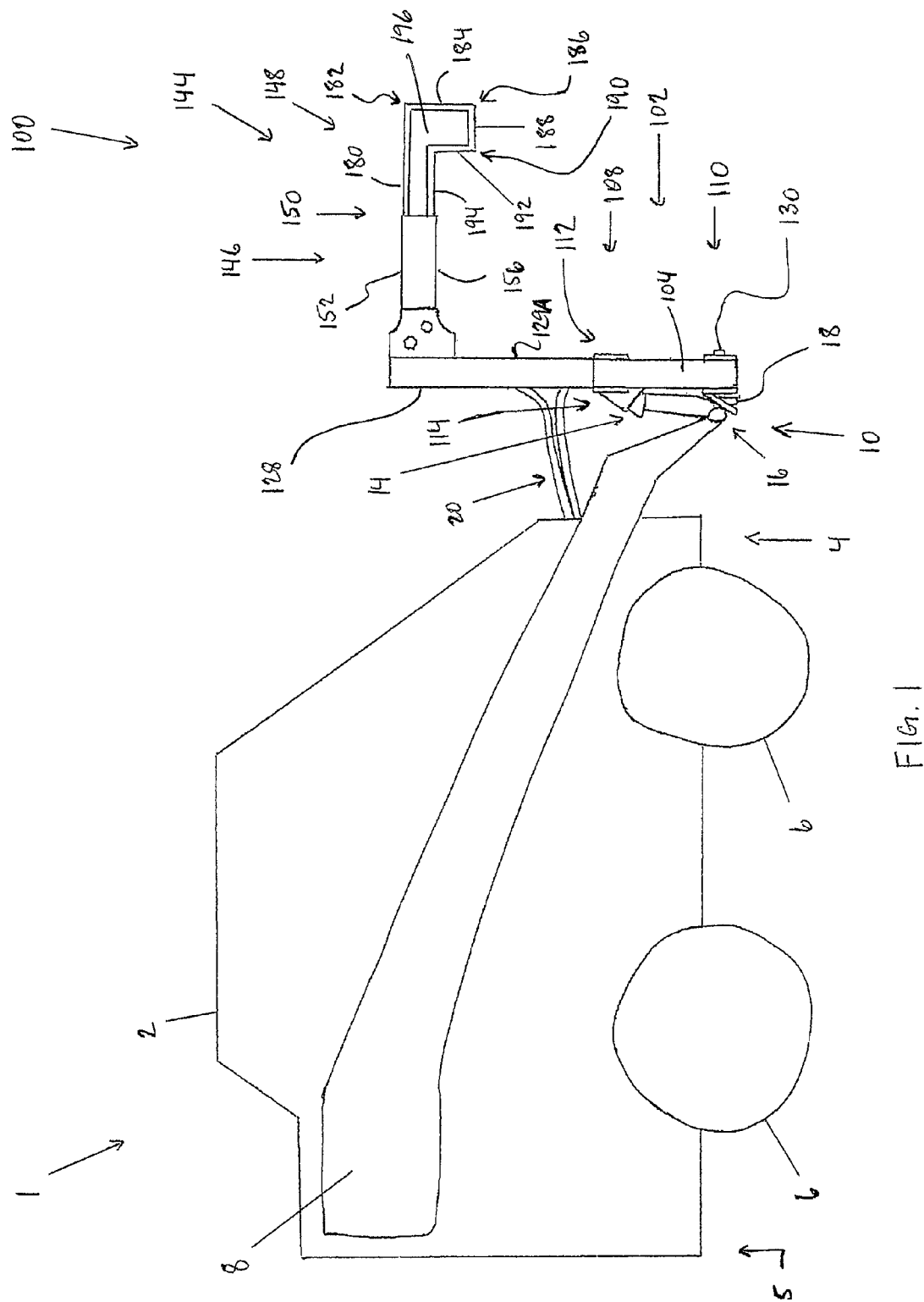
FIG. 1 is a right side elevational view of a skid steer and first arrangement of tree removal device coupled thereon, when the tree removal device is in the neutral position.

Referring to the accompanying figures, there is illustrated a tree removal device, a first arrangement of which is generally indicated by reference numeral 100 and a second arrangement indicated by reference numeral 300. The tree removal device is used in combination with a working vehicle, such as for example a skid steer 1 or compact excavator 50, to slice tree roots of a tree.

We turn to the first arrangement 100 which is illustrated in FIGS. 1-6 and which is particularly but not exclusively designed for a skid steer.

The skid steer has a frame 2 with a forward end 4 along a longitudinal axis of the vehicle and laterally opposing traction components 6 coupled to respective lateral sides of the frame and configured to move the vehicle in forward and backward directions. The traction components may be a pair of tracks centered on each lateral side of the frame or four individual wheels, each one of the wheels being positioned at a left-forward portion, right-forward portion, left-rear portion, and right-rear portion of the frame, as in the skid steer of FIG. 1. Further, the skid steer has two laterally opposed longitudinal loader arms 8 pivotably coupled to a rear end 5 of the frame. The loader arms are arranged for pivotal motion relative to the frame at the forward end of the frame. The working vehicle has a front element 10 pivotably coupled at a forward-most end of the working vehicle such that the front element is able to pivot relative to the skid steer about a lateral axis in front of the forward end of the frame. In FIGS. 1-5 showing the first arrangement 100, the front element 10 of the skid steer is a front end adapter that is coupled to forward-most ends of the loader arms.

The first arrangement 100 of the tree removal device as in FIGS. 1-6 has an attachment 102 which couples the device in fixed relation to the front end adapter 10. Coupling the attachment fixedly to the front end adapter facilitates the pivotal motion of the tree removal device relative to the skid steer 1 about the lateral axis in front of the forward end 4 of the frame 2. The attachment has two laterally opposed side members 104 that are parallel to one another and which define the lateral ends of the attachment. The side members are aligned at the lateral ends of the attachment so that a laterally-centered vertical plane divides the attachment into symmetrical halves. The side members are spaced apart so that a distance between outermost surfaces of the side members, i.e. the distance between a left side surface of a left side member and a right side surface of a right side member, is slightly larger than the distance between outermost lateral edges of the front end adapter. This spacing of the side members ensures that the attachment fits the front end adapter of the skid steer without being unnecessarily large compared to the width of the front end adapter 10. The side members are coupled together by two pairs of elongate bracing plates 106 that span laterally across the attachment. One pair of the bracing plates is attached at an upper end of the side members so that top edges of the bracing plates are aligned with top edges of the side members at a front and back thereof, and a second pair of same is attached at a lower end of the side members so that bottom edges of the bracing plates are aligned with bottom edges of the side members at the front and back thereof. The pair of bracing plates at the upper end of the side members collectively define the top cross member 108, and the pair of bracing plates at the lower end of the side members collectively define the bottom cross member 110. Further, a first plate of each pair of bracing plates is attached at a front side of the side members so as to generally face in the forward direction of the skid steer; a second plate of each pair is attached at a back side of the side members so as to generally face rearwards, towards the skid steer. Each bracing plate is attached to the side members at right angles. In such a way, the two side members and the four elongated plates collectively comprise an attachment frame 112, which is rectangular in shape.

Figure 6:
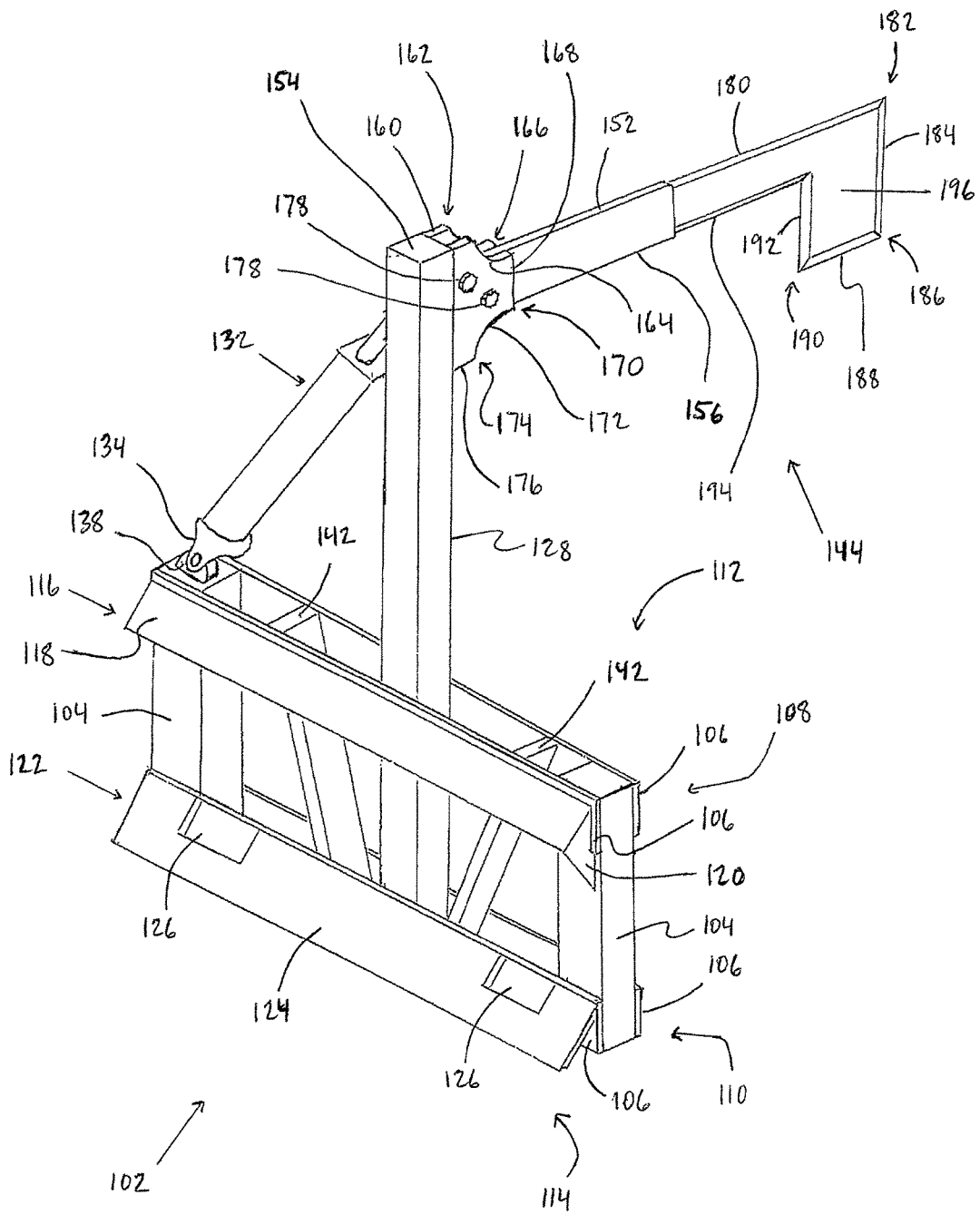
FIG. 6 is a rear perspective view of the first arrangement of tree removal device from the right side thereof.

The attachment 102 also has a coupling portion 114 as better shown in FIG. 6. The coupling portion has an upper receiving element 116 that is coupled at an upper end of the attachment frame 112. The upper receiving element receives a free end 12 of the front end adapter at a top end thereof. The upper receiving element has an upper angled plate 118 that is elongate and spans a full lateral width of the attachment frame between the outermost surfaces of the side members. The upper angled plate is attached at a top edge thereof to the bracing plate 106 at the back side of the upper end of the attachment frame so as to be angled downwards and form an angle sufficiently large to receive the free end of the front end adapter. Two triangular bracket plates 120 are located at lateral ends of the upper angled plate. These bracket plates are attached at the lateral edges of the upper angled plate, between the upper angled plate and the back side of each of the side members. The purpose of the bracket plates is to rigidify the structure of the upper receiving element so as to help in coupling the attachment frame 112 fixedly to the front end adapter 10 when the free end of the front end adapter is received therein.

The coupling portion 114 of the attachment 102 also has a lower receiving element 122 that is coupled at a lower end of the attachment frame 112. The lower receiving element receives a bottom end 14 of the front end adapter 10, where the front end adapter is pivotably coupled to the loader arms. The lower receiving element has a lower angled plate 124 that is elongate and spans the full lateral width of the attachment frame. The lower angled plate is attached at a top edge thereof to the bracing plate 106 at the back side of the lower end of the attachment frame so as to be angled downwards. Two apertures 126 for receiving upright locking pins 16 of the front end adapter are arranged near the top edge of the lower angled plate. The apertures are positioned near the top edge of the lower angled plate with outermost edges of the apertures spaced inward from the outermost surfaces of the side members 104 at a distance that is near the spacing of the locking pins from the outermost lateral edges of the front end adapter so that the apertures are aligned with the locking pins. Insertion of the locking pins 16 into respective apertures 126 secures the coupling portion 114 to the front end adapter 10.

The tree removal device 100 also includes a support member or post 128. A depth of the support post measured between a front surface 129A of the post facing in the forward direction and a back surface generally facing in the backward direction, towards the skid steer, is near a distance between innermost surfaces of the bracing plates 106 so that the support post is arranged to fit between the two pairs of bracing plates. The support post is pivotably coupled to the attachment frame with a post pivot bearing 130 at a laterally-centered point between the bracing plates at the lower end of the side members so as to extend generally upwards from the attachment frame. The post pivot bearing allows the support post 128 to be adjusted laterally anywhere between an extreme left position and an extreme right position about an axis in a vertical plane containing the longitudinal axis of the working vehicle such that the vertical plane divides the attachment 102 into symmetrical halves.

The pivotal motion of the support post 128 is afforded by a mechanical actuator, which is a tie-rod cylinder 132 in the first arrangement 100 of tree removal device. The cylinder has a base 134 and opposing head, and a barrel intermediate therebetween coupling the base and the head. A piston is situated inside the barrel and is arranged to be movable along a longitudinal axis of the cylinder between the base and head through the application of differential hydraulic pressure on opposing surfaces at two longitudinal ends of the piston. A piston rod extends from the piston through the head and terminates at an upper coupling portion 136 at a top end thereof. As such, the piston rod is movable along a stroke of the cylinder between a fully extended position, when the piston engages an inner side of the head of the cylinder, and a fully retracted position, when the piston engages an inner side of the base of the cylinder. Hydraulic hoses 18 are used to couple the cylinder to a hydraulic system of the skid steer 1. The hydraulic hoses are connected to the cylinder at two ports: one port at the head and a second port at the base. Controls onboard the skid steer direct flow of hydraulic fluid into two chambers of the cylinder 132 on opposing sides of the piston, generating the differential hydraulic pressure and causing the piston rod to move between the fully extended and fully retracted positions.

The tie-rod cylinder 132 is coupled between the attachment frame 112 and the support post 128, and is pivotable relative to both. The base 134 of the cylinder has two opposing eye holes along lying along an axis that is perpendicular to the longitudinal axis of the cylinder. The eye holes are aligned so that the axis connecting the eye holes is parallel to the longitudinal axis of the skid steer. Furthermore, the left side member of the attachment frame has a flange 138 at a top surface of the left side member. The flange has an eye hole with openings lying along an axis parallel to the vertical plane containing the longitudinal axis of the skid steer. The eye holes of the base of the cylinder and the flange are aligned, and a pivot pin is inserted, thereby coupling the cylinder to the attachment frame. The upper coupling portion 136 of the cylinder is coupled to an upper end of the support post in a similar fashion as the base is to the attachment frame. The upper coupling portion has eye holes which are aligned with an eye hole in a flange 140 protruding from a left side surface of the post so as to lie along an axis that is parallel to the vertical plane containing the longitudinal axis of the vehicle. Then, a pivot pin is inserted through the eyes holes of the upper coupling portion and the flange of the support post.

In conjunction with the lateral adjustment capability of the support post 128, the attachment 102 further includes two support members 142. The support members are set at a fixed angle relative to the side members such that top ends of the support members are positioned closer to innermost surfaces of the side members 104 as compared to bottom ends of the support members. The support members are aligned in between the pairs of bracing plates 106 of the attachment frame 112 such that the attachment still has symmetrical halves on either side of the laterally-centered vertical plane that divides the attachment as such. The purpose of the support members is to support the support post by frictional engagement thereof when the post is in one of the extreme left or the extreme right positions.

The tree removal device further comprises a knife element 144. The knife element has a support portion 146, an opposing blade portion 148, and a transition portion 150 intermediate therebetween where the support portion and blade portion meet. The support portion is elongate and is coupled to the support post 128 such that the knife element extends generally forwards from the post and so that the blade portion is forward of the support portion. With the knife element coupled to the attachment 102 by coupling of the support portion of the knife element to the support post, the knife element is pivotable relative to the frame of the skid steer 1 about the lateral axis in front of the forward end 4 of the frame 2. Additionally, coupling of the support portion to the support post affords a lateral adjustment capability of the support post, referring to the extreme left and right positions thereof, to the knife element as well. The lateral adjustment capability is important to positioning the knife element 144 in close proximity to the tree without contacting same prior to slicing the tree roots thereof, especially when a tree trunk is not vertical. The support portion has a top edge 152, which starts at the front surface 129A of the support post and terminates at the transition portion 150. The top edge of the support portion meets the front surface of the support post at a right angle. Furthermore, this top edge is below a top surface 154 of the support post. In addition to the top edge, the support portion has a bottom edge 156 that is opposite the top edge and below same. The bottom edge starts at the front surface of the support post 128 and terminates at the transition portion 150 of the knife element 144. For the description of the remaining components of the tree removal device 100, consider the device to be in a neutral position unless stated otherwise. In the neutral position, the attachment frame 112 is generally perpendicular to the ground, the support post 128 generally vertical, and the support portion 146 of the knife element 144 is generally parallel to the ground.

Two parallel plates 158 are attached at an upper end of the support post 128, which are arranged to receive the support portion 146 of the knife element 144 and couple the knife element to the support post. The parallel plates are perpendicular to the front surface 129A of the support post, and the plates are spaced apart so that the distance between inner surfaces thereof is approximately equal to the thickness of the support portion of the knife element, which is measured between outer surfaces of the support portion. Each plate 158 has a top edge 160 that is vertically aligned with the top surface 154 of the support post so as to be at the same elevation. The top edge starts at the front surface of the support post- and terminates at a first tip 162 that is forward of the front surface of the support post, at the same elevation as the top surface thereof. Next, an upper beveled edge 164 of each parallel plate starts at the first tip and slopes downwards and forwards therefrom, terminating at a second tip 166 that is below and forward of the first tip, forward of the support post 128, and below the top surface 154 of the support post. The second tip 166 is vertically aligned with the top edge 152 of the support portion 146 so as to be at the same elevation. A front edge 168 of each parallel plate 158 starts at the second tip 166 and extends downwards therefrom and terminates at a third tip 170. The third tip is below the first tip 162, below the second tip 166, forward of the front surface 129A of the support post 128 at a distance that is equal to a distance from the front surface of the support post to the second tip. The third tip 170 is also vertically aligned with the bottom edge 154 of the support portion 146 so as to be at the same elevation. Next, a lower beveled edge 172 starts at the third tip 170 and extends downward and rearward therefrom, and terminates at a fourth tip 174. The fourth tip is below the first tip 162, below the second tip 166, below the third tip 170, rearward of the second tip, and rearward of the third tip. The fourth tip 174 is located at a distance from the front surface of the support post 128 that is equal to a distance of the first tip 162 from the front surface 129A. Lastly, a bottom edge 176 of each parallel plate 158 starts at the fourth tip 174 and extends rearward, terminating at the front surface of the support post 128. The bottom edge is opposite the top edge 160 of each parallel plate and meets the front surface of the support post at a right angle. Further to the parallel plates are two attachment bolts 178 that are perpendicular to the parallel plates and are threaded through same. A first one of the attachment bolts is below the second tip 166 of the parallel plates 158, rearward of the first tip 162 and fourth tip 174, and above the third tip 170. A second one of the attachment bolts is below the second tip 166, above the third tip 170, forward of the first tip 162 and fourth tip 174, and rearward of the second tip and third tip. Further, the second attachment bolt is forward of and below the first attachment bolt. The attachment bolts 178 serve to clamp the parallel plates 158 to the support portion, so as to hold the knife element 144 in fixed relation to the support post 128 through frictional engagement of the outer surfaces of the support portion 146. Use of the parallel plates and attachment bolts to couple the knife element to the support post affords exchangeability of the knife element to a replacement knife element of the same type as that illustrated in FIGS. 1-6 or to a differently shaped knife element whose structure does not depart from the scope and spirit of the present invention.

Returning to the knife element 144, the blade portion 148 of the knife element is generally L-shaped with a free end protruding downwards. The blade portion has a top edge 180 that starts at the transition portion 150, meeting the top edge 152 of the support portion 146, and terminates at a forward-most tip 182. The top edge of the blade portion is slightly below the top edge of the support portion, below the top surface 156 of the support post 128, and below the top edge 160 of each of the parallel plates 158 in the neutral position. In addition, the forward-most tip is forward of the transition portion, forward of the support post, above the top cross member 108 of the attachment frame 112, yet below the top surface of the support post in the neutral position. Next, a front edge 184 of the blade portion extends downward from the forward-most tip 182, at a right angle to the top edge 180 of the blade portion, and terminates at a bottom tip 186. Both the top edge and the front edge of the blade portion are arranged for engaging the ground in the forward direction of movement of the skid steer 1, when the blade portion 148 is pivotally rotated for engaging the ground. As such, the top and front edges are sharpened so as to perform a cutting action in the forward direction of movement. A bottommost edge 188 starts at the bottom tip and extends rearward therefrom, terminating at a rear tip 190. The bottommost edge meets the front edge 184 at a right angle. The rear tip is rearward of the forward-most tip 182 and the bottom tip 186, below the forward-most tip, forward of the transition portion 150 of the knife element 144, and above the top cross member 108 of the attachment frame 112. The combination of the bottommost edge 188, front edge 184, and the bottom tip 186 are arranged for engaging the ground in both the forward and backward directions of movement of the skid steer 1, when the blade portion 148 is pivotally rotated to engage the ground. As such, the bottommost edge is sharpened in addition to the front edge so as to perform a digging action in both directions of movement of the skid steer. A rear edge 192 starts at the rear tip 190, extending upwards therefrom and terminating at a top end of the rear edge. The rear edge and bottommost edge form a right angle at the rear tip. The top end of the rear edge is above the bottom tip 186, above the bottommost edge 188, below the top edge 180 of the blade portion, and rearward of the forward-most tip 182. Both the rear edge and the bottommost edge are arranged for engaging the ground in the backward direction of movement of the skid steer, when the blade portion is pivotally rotated for engaging the ground. As such, the rear edge is sharpened in addition to the bottommost edge so as to perform a cutting action in the backward direction of movement. Finally, a bottom edge 194 of the blade portion 148 starts at the top end of the rear edge 192 and extends rearward therefrom and ends at the transition portion 150 of the knife element 144, meeting the bottom edge 154 of the support portion 146. The bottom edge 194 of the blade portion meets the rear edge thereof at a right angle. Further, the bottom edge is opposite the top edge 180 of the blade portion, above the bottommost edge 188 thereof, and slightly above the bottom edge of the support portion. The bottom edge is arranged for engaging the ground in the backward direction of movement of the skid steer 1, when the blade portion 148 is pivotally rotated for engaging the ground. As such, the bottom edge 194 is also sharpened to perform the backward cutting action in conjunction with the rear edge 192 and bottommost edge 188.

It is possible to have the knife element 144 coupled directly to the attachment 102 via direct coupling to the attachment frame 112 in lieu of using the support post 128. As such, the purpose of the support post is to elevate the knife element so that the bottom tip 186 is above the top cross member 108 of the attachment frame and consequently viewable by an operator sitting in a cabin within the frame 2 of the skid steer 1. For the same reason of visibility, it is crucial that the width of the support post, defined by the distance between the left side surface and a right side surface of the support post, is proximate the sum of the thicknesses of the two parallel plates 158 and the thickness of the support portion 146 of the knife element 144 so that the knife element is viewable from around the support post, from the left or right side thereof. In addition to providing visibility, elevating the knife element through use of a support post extends the forward reach of the knife element when the knife element is pivotally rotated to engage the ground so that the distance from the bottom tip 186, when pivotally rotated to engage the ground, to the top cross member 108 is larger than same if the knife element were directly coupled to the attachment 102. The larger forward reach of the bottom tip allows the skid steer 1 to be maneuvered closer to the tree trunk when performing a cutting action.

In use, the tree removal device 100 is first be attached to the skid steer 1. Attachment of the device to the skid steer is accomplished by driving the skid steer towards the tree removal device and positioning the front end adapter 10 so as to insert the free end 12 thereof into the upper receiving element 116 of the coupling portion 114 of the attachment 102. Once the free end of the front end adapter has been inserted into the upper receiving element, the front end adapter is lifted upwards so as to lift the tree removal device 100 off of the ground. Furthermore, the front end adapter is pivotally adjusted so as to bring the device to the neutral position. Bringing the device to the neutral position ensures that the bottom end 14 of the front end adapter aligns with the lower receiving element of the coupling portion. Once the bottom end 14 of the front end adapter overlaps the lower receiving element 122, the operator of the skid steer 1 should push the tree removal device down by pulling the blade portion 148 of the knife element 144 downwards so as to insert the free end 12 of the front end adapter 10 fully into the upper receiving element 116. Next, the locking pins 16 of the front end adapter are pushed downwards so as to be inserted into the apertures of the lower receiving element, securing the attachment to the front end adapter. Furthermore, the hydraulic hoses 18 of the skid steer are connected to the base 134 and head of the cylinder 132 to provide hydraulic power to the cylinder.

With the tree removal device 100 mounted to the skid steer 1, the combination of the two is ready for slicing tree roots. The skid steer is maneuvered so as to position the knife element to one side of the tree in a first cutting position, so that when the knife element 144 is pivotally rotated to engage the ground, the bottom tip 186 of the blade portion 148 is proximate a center of the respective side of the tree. The knife element may be laterally pivoted from the neutral position using the cylinder 132 to any lateral position between the extreme left position and the extreme right position as needed, so as to bring the knife element closer to the tree trunk without engaging same. Positioning the knife element in close proximity to the tree trunk, as judged by the operator of the skid steer who is skilled in the art of transplanting trees, is necessary to be able to slice as many tree roots as possible on each side of the tree. Then, the knife element is pivotally rotated so as to insert a forward-most portion of the blade portion into the ground, which includes the bottom tip, the bottommost edge 188, and the front edge 184. It is important to realize that the ease of insertion of the forward-most portion will depend on the toughness of the soil. With as much of the blade portion 148 inserted into the ground as possible, the skid steer 1 is moved backwards in a straight line whereby a cutting action is performed in the same direction. The skid steer is moved backwards so far as is deemed necessary to slice the tree roots on that side of the tree, which will be determined by the operator. A mark left in the ground where the cutting action was performed is called a cutting line. After, the skid steer is moved forwards to perform a cutting action in the forward direction along the same cutting line as the previous cutting action. The skid steer is moved forwards so far as the cylinder 132 or top cross member 108 do not contact the tree trunk. The aggregation of one cutting action in the forward direction and one cutting action in the backward direction on a single side of a tree is called a pass. Depending on the perceived depth of the tree roots, which is judged by the operator based on tree type, additional passes may be needed in order to slice the roots to an appropriate depth. The blade portion 148 is pivotally rotated deeper into the ground on each subsequent pass to achieve cutting at greater depths. Alternatively, the blade portion can be pivoted deeper into the ground after a single cutting action in one direction. Gradually pivoting the blade portion downwards after each cutting action might require fewer passes to fully slice the roots on each side of the tree. Furthermore, the front end adapter 10 may be elevated upwards when the blade portion is engaging the ground, in addition to pivoting the blade portion downward, to afford a substantially deeper cut than by pivoting of the blade portion alone. Regardless of the number of passes that are required to fully slice the roots, it is important perform each subsequent cutting action along the same cutting line so as to slice the tree roots at a single point along the root. In this manner, the tree roots are less likely to become damaged as a result of the cutting action and the root ball will be preserved, which is important when the tree will be transplanted. Once the roots are fully sliced on the one side of the tree, the skid steer is maneuvered to reposition the knife element 144 on the opposite side of the tree in a second cutting position so that rectilinear cutting actions in this second cutting position are approximately parallel to the cutting line from the first cutting position. The same process of inserting the blade portion 148 into the ground, following by forward and backward movements of the skid steer 1, and gradual pivoting of the blade portion deeper into the ground is followed to fully slice the tree roots on the side of the tree corresponding to the second cutting position. After all slicing is completed in the second position, the skid steer is manoeuvered into a third cutting position on another side of the tree so that the resulting rectilinear cutting actions in the third position are substantially at right angles to the cutting lines of the first and second positions. The cutting actions performed in the third position should intersect regions of the cutting actions performed in the first and second positions. As such, the cutting process is repeated, after which the skid steer is manoeuvered into a fourth cutting position whose corresponding rectilinear cutting actions will be substantially parallel to same in the third position. If any one of the cutting lines do not intersect after performing passes along the first four cutting positions, the skid steer 1 is manoeuvered into a new position, from which the cutting process can be repeated along any one of the previous cutting lines of the four cutting positions so as to fully slice all tree roots by intersecting the remaining cutting lines with subsequent cutting actions.

Thus, in the first arrangement shown in FIGS. 1-8 there is illustrated a working vehicle, that is, the skid steer 1 which has a pair of loader arms or working arms 8 extending longitudinally of the frame 2 on either side thereof. As more clearly shown in FIG. 3, the working arms are pivotally mounted on the frame 2 generally at but spaced inwardly from the rear end 5 of the frame with free ends of the arms 8, which are at the bottom ends 14 of the front end adapter 10, located at or adjacent the forward end 4 of the frame.

Figure 2:
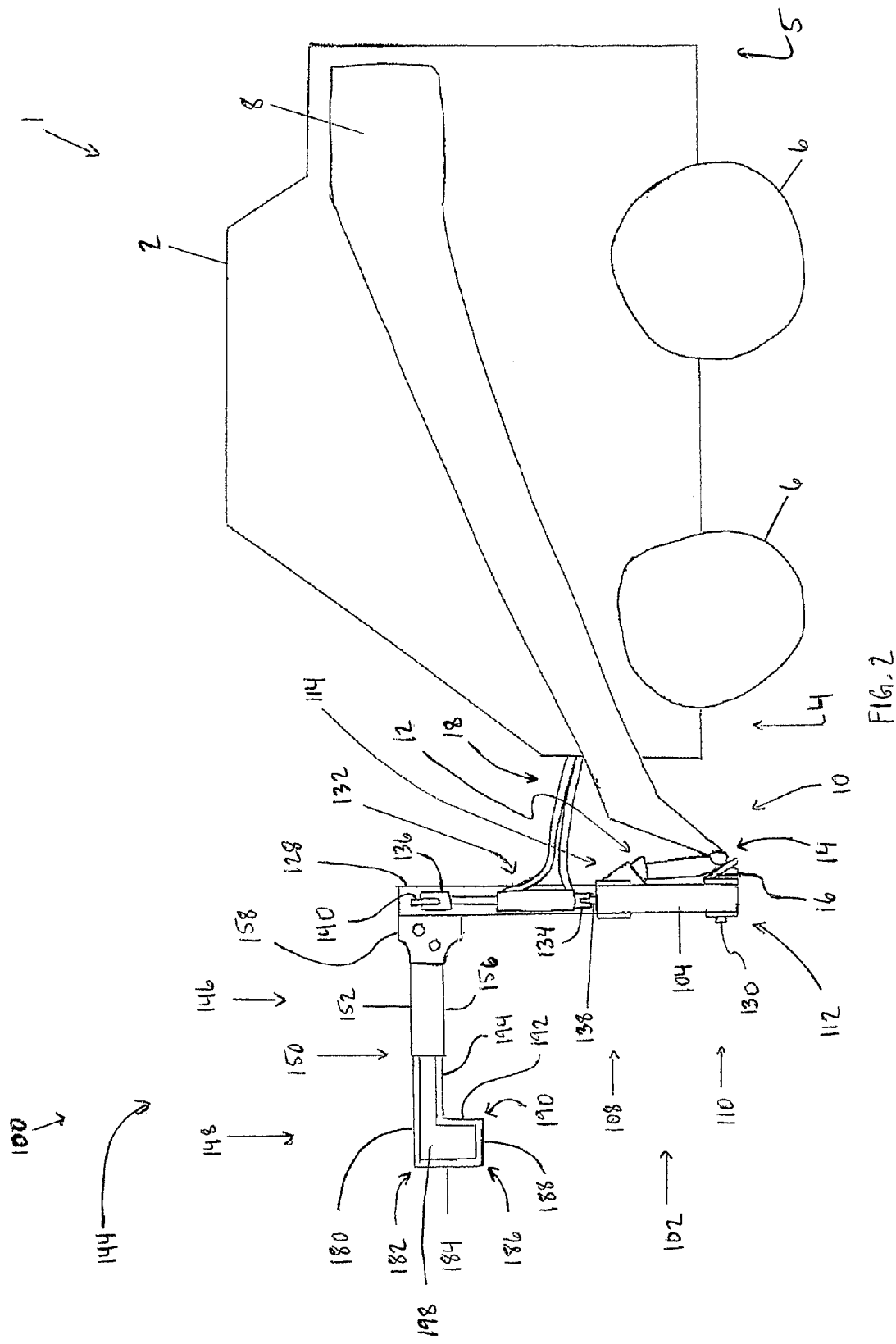
FIG. 2 is a left side elevational view of the skid steer and tree removal device coupled thereon, when the tree removal device is in the neutral position.

FIG. 1-2 illustrate front element 10 which is pivotally carried on the working arms 8 at the free ends thereof which are at the bottom ends 14 of the front end adapter 10. The front element 10 is pivotally movable relative to the frame 2 about a lateral axis spaced from the frame 2.

It is apparent that the free ends of the loader/working arms 8 are located beyond a peripheral boundary of the skid steer which includes the frame 2, an outer shell, and cab where an operator is seated within the frame. Range of movement of the free end which is determined by configuration of the arms 8 is located about the peripheral boundary of the vehicle in spaced relation to the frame 2.

Figure 3:
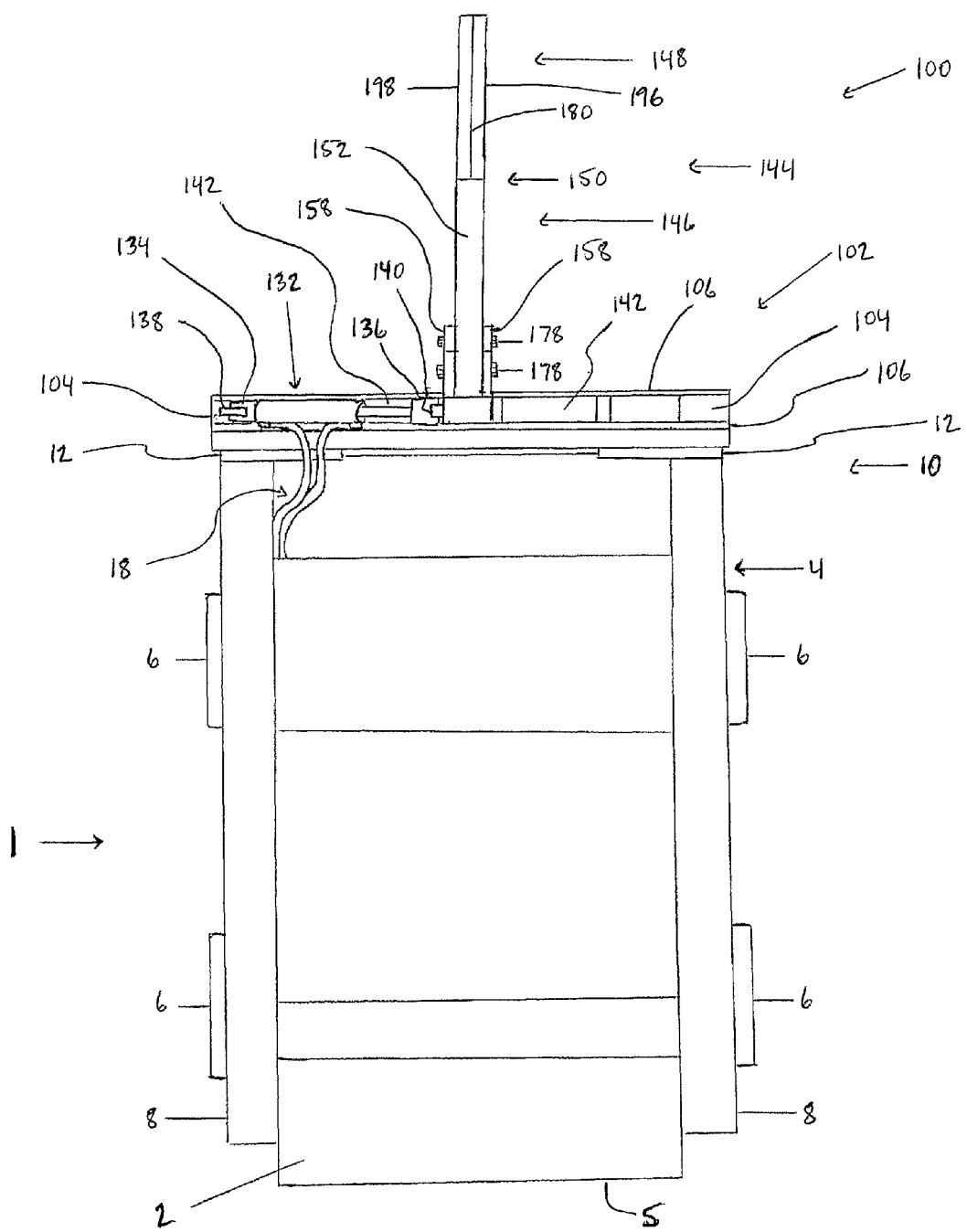
FIG. 3 is a top plan view of the skid steer and tree removal coupled thereon, when the tree removal device is in the neutral position.

Furthermore, FIGS. 1-3 more clearly show an attachment portion of the tree removal device 100 that includes the attachment frame 112 and support member or post 128.

The base attachment frame 112 is planar, as shown in the figures showing the first arrangement 100, and is coupled to the front element 10 of the skid steer in fixed relation thereto such that the frame 112 is oriented laterally to the skid steer as more clearly shown in FIG. 3.

The support post 128 projects outwardly from the base attachment frame 112 in a direction away from the front element 10 of the skid steer. More specifically, in the first illustrated arrangement 100 the support post 128 extends from the bottom cross member 110 upwardly beyond the top cross member 108 in a plane of the attachment frame 112, as more clearly shown in for example FIG. 2.

FIGS. 1-2 and 4-6 illustrate the knife element 144 carried on the support member 128 at a location thereon that is spaced from the base attachment frame 112 of the tree removal device. That is, in the first arrangement the knife element 144 is arranged at a location on the support post 128 which is beyond a periphery of the base attachment frame 112 indicated collectively at 104, 108, and 110.

The knife element projects forwardly from the support post 128 such that the blade portion 148 at a free forward end of the knife that is usable for slicing tree roots is held at a position spaced forward of the vehicle frame 2.

The support post 128 is supported in fixed position to the base attachment frame 112 relative to the lateral axis such that the support member is movable in fixed relation with the attachment frame 112 about the lateral axis.

It is clear that the support post 128 of the first arrangement is movable in laterally side-to-side directions in movement actuated by the hydraulic cylinder 132.

Turning now to the knife element, this is supported in fixed position relative to the support post 128, which in the first arrangement is achieved by the pair of parallel plates 158 receiving the support portion 146 of the knife element, with bolts 178 passing cooperatively through the plates 158 and the knife element 144.

The knife element is supported on the support member at a receptacle indicated collectively at the pair of reference numerals 158 and 129A that receives the knife element therein. As such, knife elements having different shapes of blade portions are interchangeable on the support post 128. Furthermore, in the illustrated first arrangement the knife element is held in butting engagement at its rear with a closed bottom of the receptacle, that is the front surface 129A of the support post.

Figure 5:
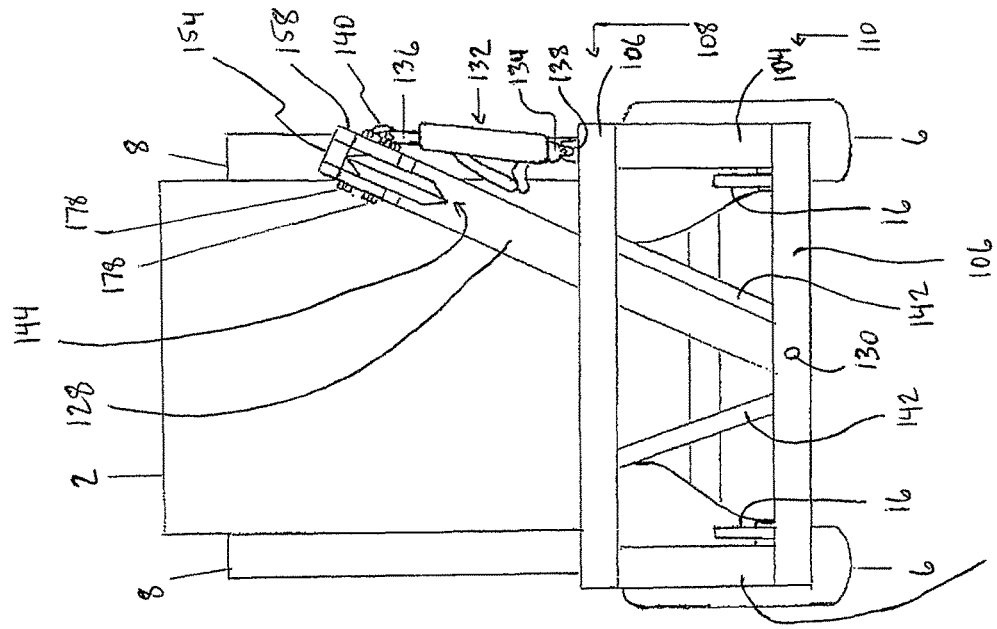
FIG. 5 is a front elevational view of the skid steer and tree removal device coupled thereon, when the tree removal device is in the neutral position, the support post and knife element are tilted in the extreme left position, and the cylinder is in the fully retracted position.
Figure 4:
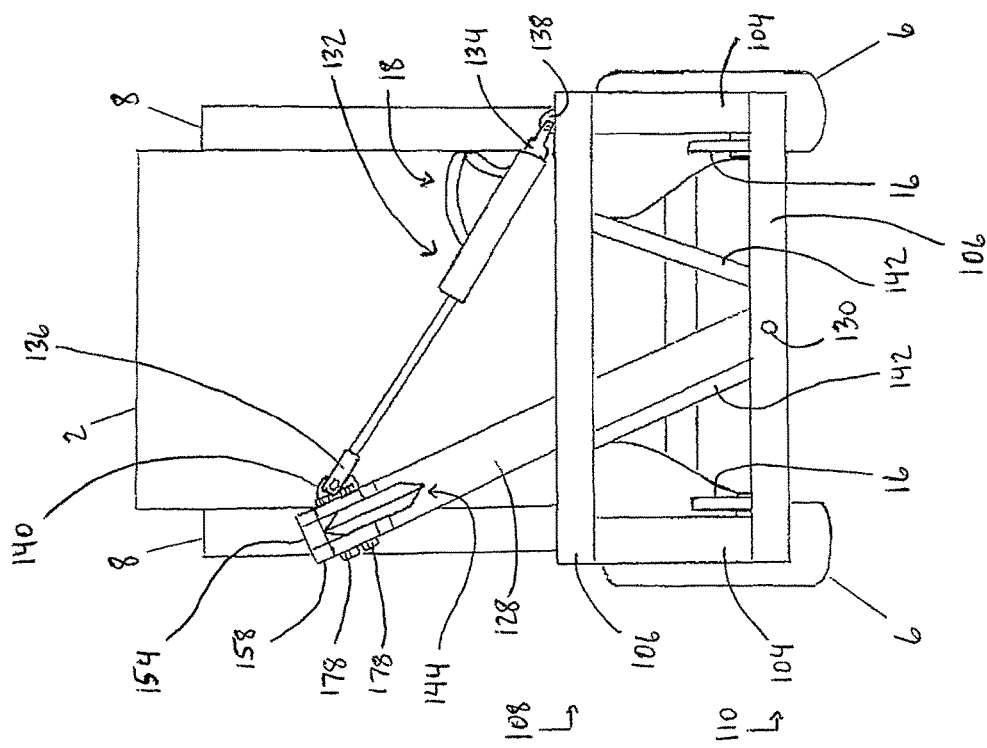
FIG. 4 is a front elevational view of the skid steer and tree removal device coupled thereon, when the tree removal device is in the neutral position, the support post and knife element are tilted in the extreme right position, and the cylinder is in the fully extended position.

The blade portion 148 has planar faces indicated at 196 and 198 on either side of the blade portion and facing generally in a laterally horizontal direction, as more clearly shown in FIGS. 3-5.

Further, the blade portion has a perimeter edge collectively indicated at 180,184,188,192, and 194 which join the planar faces 196, 198 about their periphery at the free end of the knife element 144 such that the planar faces are contiguous at the perimeter edge. Furthermore, at least a portion of this perimeter edge is sharpened so as to perform a cutting action on the tree roots when the skid steer is operated including being moved in forward and backward directions across the ground (that is, generally a support surface).

In the first arrangement, the perimeter edge 180, 184, 188, 192, and 194 is sharpened along its entire length. Thus, the knife element is arranged for slicing tree roots in a plurality of orientations of the blade portion. It will be appreciated that an entirety of the length of the perimeter edge need not necessarily be sharpened, although a larger length of the perimeter edge which is sharpened Also, the sharpened portion of the perimeter edge in the first arrangement is a continuous length thereof.

As such, when the blade portion is positioned in engagement with the ground, the front element 10 may be pivoted so as to increase an angle of the knife element relative to (a horizontal defined by) the ground which for example cooperatively with an act of holding the base frame at a substantially constant height above the ground serves to insert the blade portion more deeply into the ground while still being able to slice roots.

It is also clear from the figures that the perimeter edge is smooth so as to be free of serrations. The edges 180, 184, 188, 192, and 194 are linearly extending and do not form any pair of adjacent vertices or tips, like those indicated at 182 or 186 or 190, that are separated by a recess where edges intersect at an angle less than 180 degrees. This allows for the tree roots to remain substantially undamaged so as to render the tree transplantable after slicing of the roots. Thus, the roots are simply reduced in length and sliced so as to separate from a root system root ends which may not be critical to maintaining the root ball.

Furthermore, with the tree removal device coupled to the working vehicle, which in the first illustrated arrangement is the skid steer, the device may be operated generally by performing the following steps:

a) engaging the ground on one side of the tree with the blade portion 148 by pivoting the knife element 144 into the ground using the front element 10 of the vehicle;

b) moving the vehicle frame using its traction components in at least one of the forward and backward directions so as to perform cutting action with the cutting edge in the respective direction of movement for slicing the tree roots disposed on that side of the tree thereby forming a pass on that side of the tree;

c) repositioning the vehicle to another side of the tree for repeating steps a) and b) so as to form a plurality of passes about the tree to completely slice the tree roots such that the tree is removable from the from the ground in a condition where the tree is transplantable.

In the example of the skid steer arrangement, each pass comprises a plurality of cutting actions including progressively inserting the blade portion 148 deeper into the ground.

Step b) above of this method is particularly suited for working vehicles of the type which lack ability to variably adjust a distance of the free end of the knife element 144 where the blade portion 148 is formed in outward relation to the frame 2 of the working vehicle. This type of adjustment of outward distance from the vehicle frame may be used to move the blade portion 148 at least one of forwardly and backwardly so as to perform the cutting action, which may be alternatively or in addition to the movement of the frame using the traction components to effect the cutting action with the cutting edge.

Turning now to the second arrangement 300 of tree removal device shown in FIGS. 7-11, this arrangement as illustrated is particularly but not exclusively designed for use with excavator 50. The illustrated excavator 50 is of the compact/mini type, however the tree removal device may be adapted for use with large excavators typically used in heavy construction.

Figure 7:
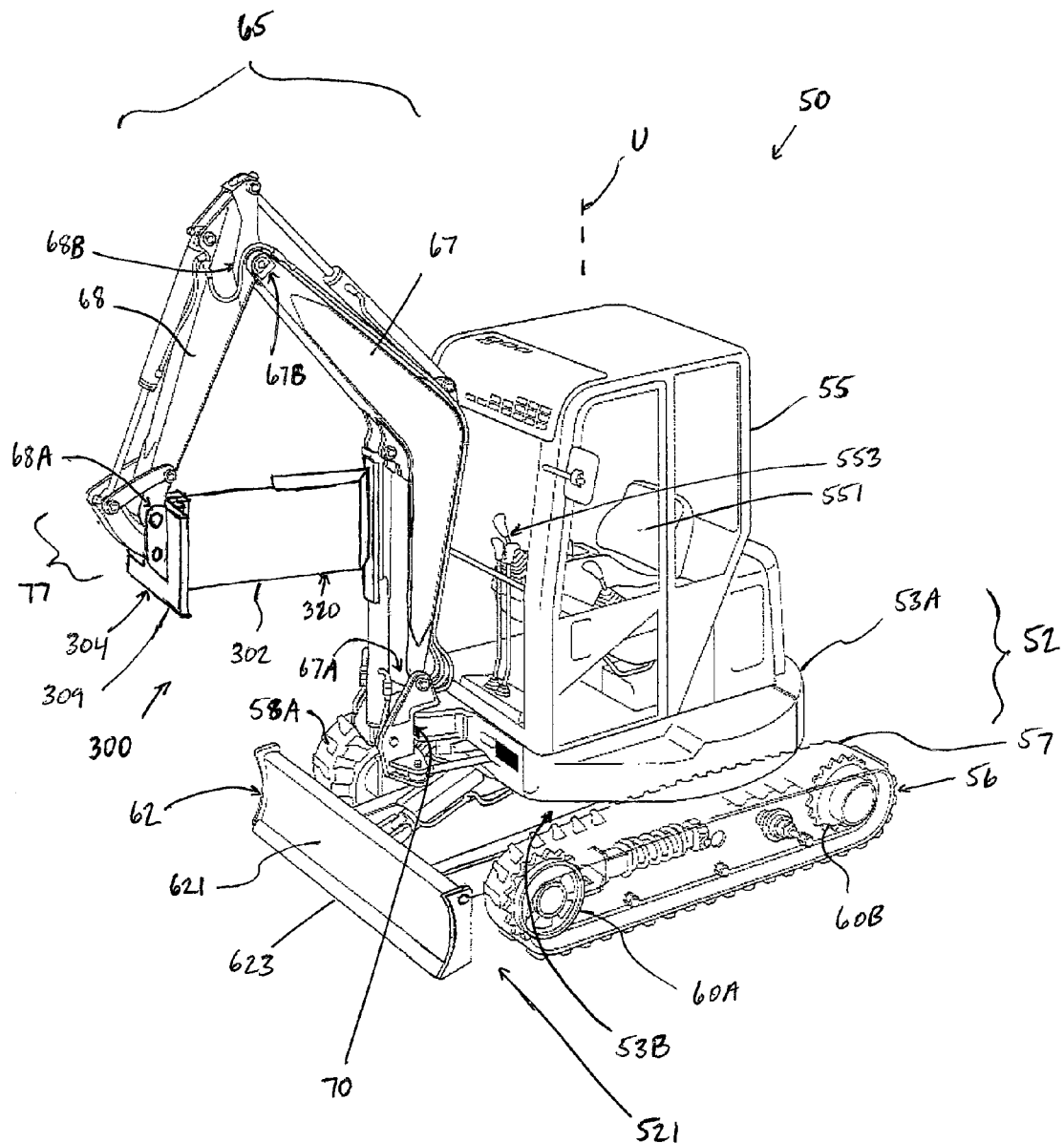
FIG. 7 is a perspective view of a compact excavator with a second arrangement of tree removal device which is arranged for coupling to the excavator where the excavator is shown with its working arm in a retracted position.
Figure 8:
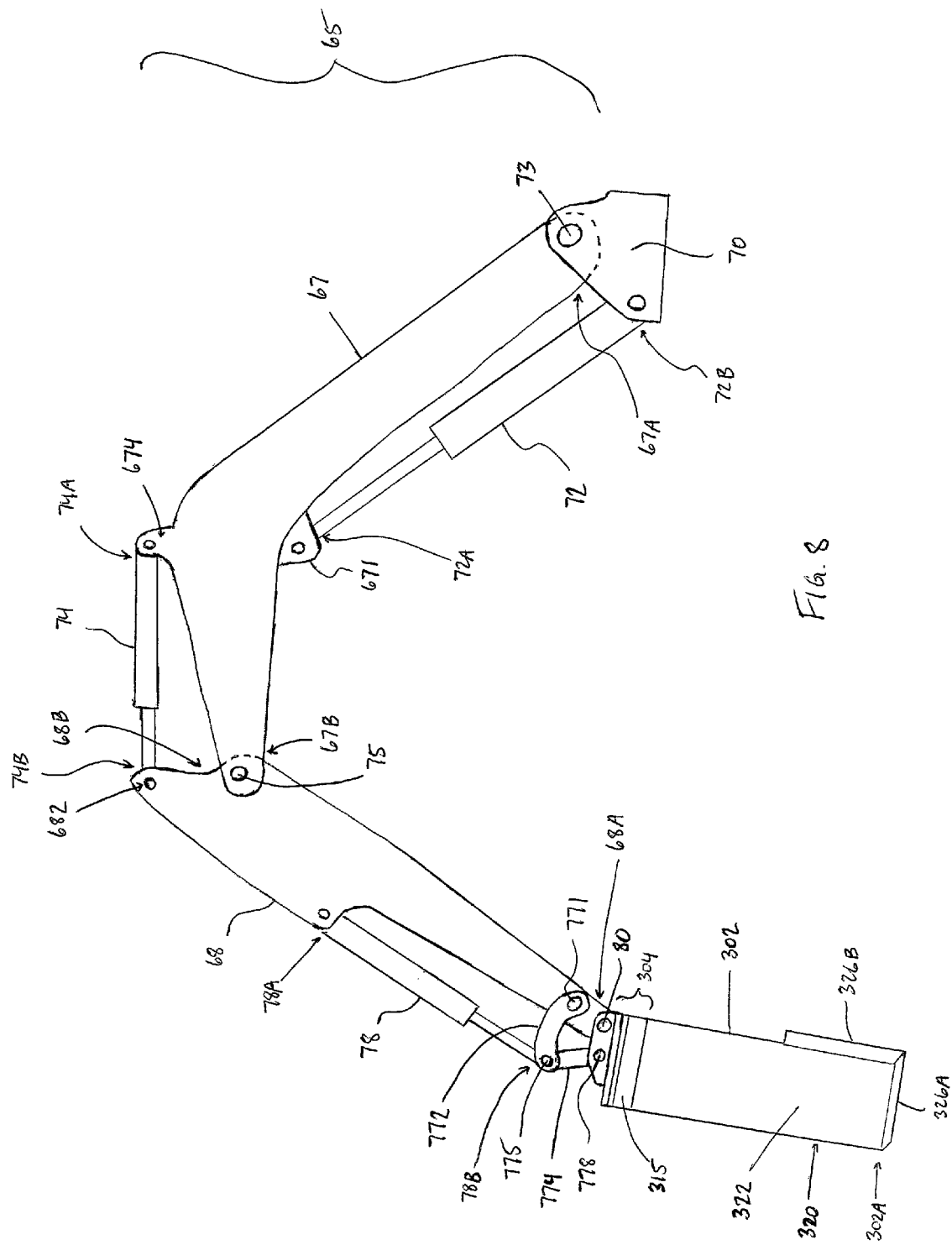
FIG. 8 illustrates in side elevation an excavator's working arm in an extended position with the tree removal device on the arm, where some components are omitted for clarity of illustration.
Figure 9:
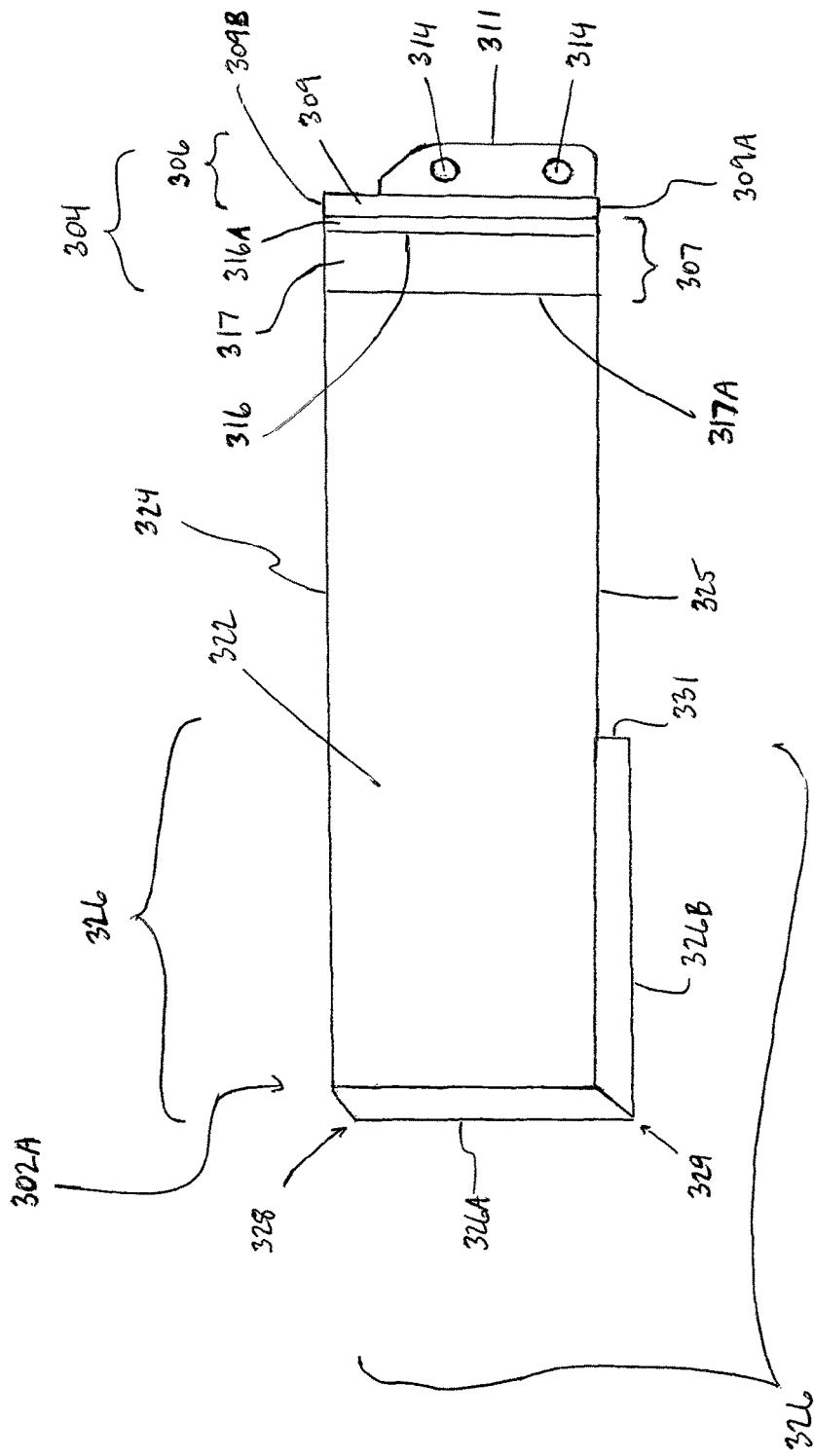
FIG. 9 is a side elevational view of the tree removal device of the second arrangement.

The conventional compact excavator 50 of FIG. 7 comprises a frame 52 with a rotatable top portion 53A (sometimes referred to in industry as a house) forming a platform which supports a cab 55 thereon for housing an operator. The rotatable platform 53A is arranged for rotational movement about an upstanding axis U (typically referred to as slew) in a conventional manner known in the art and thus not described in detail herein. Inside the cab 55, there is provided a seat 551 and controls 553 for operating the excavator.

The rotatable platform 53A is supported in its rotational movement by a bottom portion 53B of the frame (sometimes referred to in industry as an undercarriage) which is operatively connected to the top portion 53A in a conventional manner known in the art and thus not described in detail herein. The bottom portion 53B carries at its lateral sides a pair of traction components in the form of conventional tracks 56. Each conventional track 56 includes an endless belt 57 carrying tread 58A for gripping a support surface (e.g. loose dirt on the ground). The belt 57 is driven in rotational movement by a pair of spaced rotational conventional drive members 60A, 60B at opposite ends of the loop formed by the endless belt.

It will be appreciated, as mentioned earlier, that tracks generally similar to those indicated at 56 in FIG. 7 may be employed on a skid steer like that indicated at 10.

The tracks 56 of the excavator are disposed on either side of a longitudinal axis of the excavator, where the excavator 50 defines the working vehicle of this second arrangement.

In the excavator illustrated in the figures, there is provided at a forward end 521 along the longitudinal axis a conventional blade 62 (sometimes referred to in industry as a backfill blade). The blade 62 is located centrally of the frame 52 and extends laterally across at least a majority of the frame width. The blade 62 includes a curved front pushing surface 621, a rear blade surface (not clearly shown), and a bottom blade surface (also not clearly shown) that extends between a bottom blade edge 623 at the front pushing surface and a bottom of the rear blade surface. Furthermore, the blade is supported from the frame 52 so as to be arranged for upward and downward movement relative thereto, which is achieved in a conventional manner known in the art and thus not described in detail herein. As such, the blade is usable for operations such as grading, leveling, backfilling, trenching, and general bulldozer work.

Additionally, there is provided a working arm 65 of the excavator which is carried on the rotatable top portion 53A of the frame such that the working arm 65 is movable in rotational movement therewith about the upstanding axis U. Thus, generally speaking the working arm 65 extends radially of the frame 52 with respect to the upstanding axis U.

The working arm 65 of the illustrated excavator comprises a pair of sections 67 and 68 which are configured in a manner conventional in the field of excavators. A first arm section 67 defining a proximal end or base of the arm 65 is pivotally connected at lower end 67A to a mounting base 70 coupled to the frame's rotatable top portion 53A. A second arm section 68 defining a distal free end 68A of the arm 65 is pivotally connected at an upper end 68B to an upper end 67B of the first arm section.

Thus the free end 68A is located beyond a peripheral boundary of the excavator, which includes the frame 52 with cab 55, such that the free end of the arm 65 is located in spaced relation to the frame 52.

The first arm section 67 follows a generally curved path upwardly and radially outwardly from the mounting base 70. At an apex of the first arm section there is provided at an underside of the first arm section 67 connection 671 for a first hydraulic cylinder 72 between this arm section 67 and the mounting base 70. Thus, the first hydraulic cylinder 72 which is supplied with hydraulic fluid from a hydraulic system of the excavator (not shown) is arranged for raising and lowering the first arm section in pivotal movement about an axis defined by pin 73 at the first arm section's lower end 67A. The first hydraulic cylinder is pivotally connected at its piston rod end 72A to connection 671 and at its cylinder end 72B to the mounting base 70 so as to facilitate the raising and lowering of arm section 67 in upward and downward pivotal movement relative to the mounting base.

The second arm section 68 follows a generally linear path from its upper end 68B at the first arm section 67 to its lower end 68A defining the free end of the working arm. The second arm section is shaped in a manner so as to provide a connection point 682 for a second hydraulic cylinder 74 above pin 75 defining a pivotal joint of the first and second arm sections 67, 68. The second hydraulic cylinder 74 is connected at a cylinder end 74A to a connection 674 of the first arm section 67 forming an upstanding ear above the first section's apex, and at its piston rod end 74B to an aperture in the second arm section 68 that is located above the pin 75. As such, the second hydraulic cylinder 74 is arranged for providing folding movement of the arm sections 67, 68 relative to one another such that the free end 68A of the working arm is movable between a retracted position of the arm 65 in which the free end is generally in close proximity to the frame 52 of the excavator and an extended position in which the free end 68A is located further outwardly of the frame 52 than in the retracted position.

At the lower free end 68A of the second arm section there is provided a front element 77 pivotally carried on the arm 65 at its free end in the excavator of the illustrated arrangement. The front element 77 is operable for controlling an attachment coupled thereto. In a working vehicle such as the excavator, the front element is defined by a conventional linkage assembly including pin 771 at the free end 68A; a first linkage 772 pivotally connected to the second arm section at a location spaced towards the upper end 68B but still located much closer to the free lower end than the upper end; and a second linkage 774 pivotally connected at pin 775 at an end of the first linkage distal to the second arm section and extending therefrom in a direction downwardly towards but spaced from the free end 68A of the second arm section. A lower end 774A of the second linkage, cooperatively with the free end 68A of the second arm section, may carry an attachment such as the tree removal device 300 and manipulate its orientation about a lateral axis generally located at the free end of the working arm by operating a third hydraulic cylinder 78 which is connected at the pin 775 at an interconnection of the first and second linkages and to the second arm section at a location thereon intermediate the lower and upper ends 68A, 68B. In particular, a cylinder end 78A of the third hydraulic cylinder is pivotally connected to the second arm section 68 and a piston rod end 78B of this cylinder is pivotally connected to the linkage assembly defining the front element.

Hydraulic fluid may be delivered to the second and third hydraulic cylinders by the same or a different hydraulic system supplying the first hydraulic cylinder.

It will be appreciated that the free end of the working arm is positionable at a plurality of locations radially of the upstanding axis U, and one of these locations includes positioning at the forward end 521 of the frame so as to be in front thereof. In this particular position of the working arm, the working arm 65 is extending longitudinally of the frame 52 which is typically a preferred position when operating the working arm as the blade 62 may be used to adjust a vertical range of movement of the arm's free end 68A. That is, for example the blade 62 can be lowered so as to engage the ground in a manner causing the forward end 521 to be raised from the ground, thereby shifting upwardly upper and lower limits of the vertical range of movement, or alternatively the blade can be raised so that the forward end 521 may be tipped downwardly, thereby shifting downwardly the upper and lower limits of the vertical range of movement.

It will be noted that the first and second arm sections 67, 68 and the linkage assembly 77 are sometimes collectively referred to in industry as a workgroup of the excavator.

Turning now in more detail to the second arrangement of tree removal device, the device 300 includes a knife element 302, similar in shape to that indicated at 144 in the first arrangement 100, and an attachment portion 304 for coupling the knife element to the front element 77 on the working arm.

The attachment portion of the tree removal device comprises a base frame 306 where the device attaches to the working vehicle at its working arm, and an attachment arrangement 307 joining the knife element and the base frame together.

In the illustrated arrangement the base frame 306 includes a base plate 309, which is for example rectangular in shape, up against which a rear end of the knife element 302 is held in butting engagement therewith at a front face of the base plate 309. At a rear face of the base plate there is supported, as part of the base frame 306, a pair of parallel flanges 311 in spaced relation across a width of the base plate. Each flange 311 includes a pair of apertures 314 for connecting to the front element 77 by for example receiving pins 778 at the lower end 774A of the second linkage and pin 80 at the free end 68A of the working arm 65. In the illustrated arrangement, bottoms of the flanges 311 are arranged flush with a bottom edge 309A of the rectangular plate 309. Furthermore, the flanges 311 are arranged perpendicularly to the bottom edge 309A and symmetrically about a line defining a center of the plate 309 across its width, so that the planar knife element 302 centrally located at the front of the base plate may be held in a common upstanding plane defined by the working arm 65.

Figure 11:
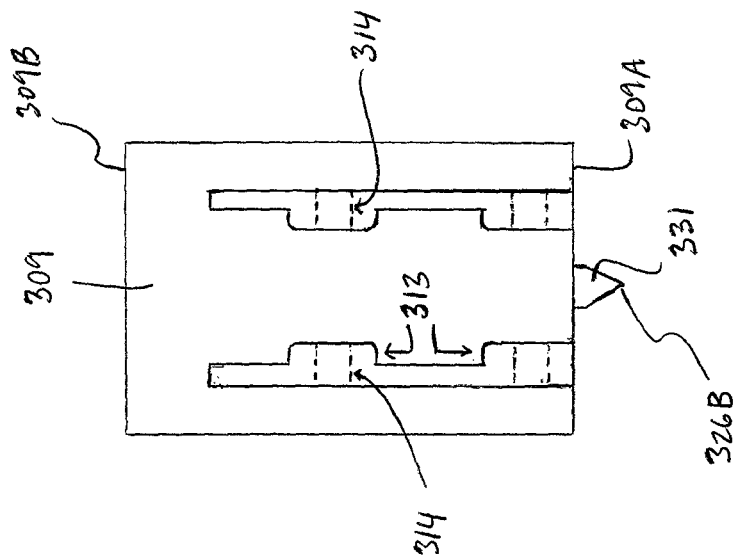
FIG. 11 is a rear elevational view of the tree removal device of the second arrangement.
Figure 10:
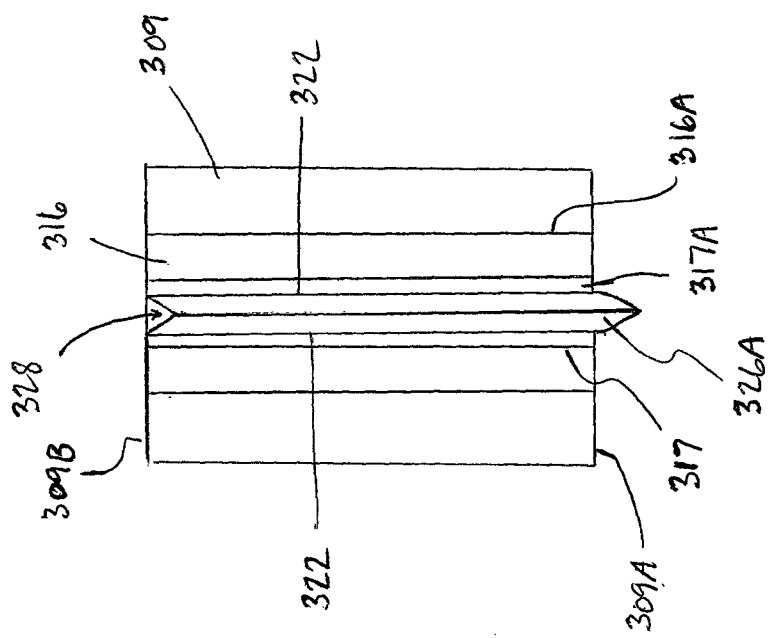
FIG. 10 is a front elevational view of the tree removal device of the second arrangement.

As more clearly shown in FIG. 11, the flanges 311 which are for example welded at the rear face of the base plate 309 include inwardly protruding portions 313 at cooperating apertures 314 arranged transversely across from one another. Thus at the respective inwardly protruding portion 313 a portion of the flange around a full periphery of the respective aperture is thickened relative to other portions of the flange, for example an intermediate portion between the apertures and a top portion between that aperture closest to a top edge 309B of the plate 309 and a terminal top edge of the flange that is spaced from the plate's top edge. The increased thickness of the flange around the aperture due to the inwardly protruding portion may serve to increase strength of the flange where it connects to the excavator working arm 65.

The attachment arrangement 307 at the front face of the base plate 309 includes a pair of brackets 315 in the form of angle irons on either side of the knife element 302. As such, each of the brackets 315 has a first planar portion 316 extending from one side of the knife element across the front face of the base plate 309 to an edge 316A spaced from a side edge of the plate 309, and a second planar portion 317 extending from the front face of the base plate 309 along one planar side face of the knife element to an edge 317A spaced from a distal free end 302A of the knife element.

Thus, the knife element is received between the pair of brackets 315, which form a receptacle cooperatively with the front face of the base plate 309, where the rear end of the knife element is in butting engagement with a bottom of this receptacle at the plate's front face.

In the illustrated arrangement the knife element is welded to the attachment portion, for example both where its rear end meets the base plate and to the angle irons 315 which are themselves welded to the base plate.

It will be appreciated that in other versions (not expressly shown) of the tree removal device 300 the knife element may be removably coupled to the attachment portion as the knife element 144 of the first arrangement 100. Furthermore, such removable coupling may be achieved in a similar manner as that described with regards to the first arrangement 100, such that for example the knife element 302 may be bolted to the brackets 315 at the second planar portions 317 which would thus have apertures alignable with apertures in the knife element for cooperatively facilitating passage of bolts therethrough.

Turning now in more detail to the knife element, the knife element 302 is carried on the base frame so as to project outwardly from the base plate 309 of the base frame in a direction away from the front element 77 of the excavator. As such, a blade portion 320 of the knife element, which in the illustrated arrangement is a distal portion of the knife including that extending from the free end 302A towards the base plate 309 but not along a full length of the knife element, is held at a position spaced from the frame 52 of the working vehicle (even in the retracted position of the working arm).

The knife element is elongated in this direction in which it extends from the base plate 309 and has a thickness measured between planar faces 322 of the knife element which is significantly smaller in size than each of the length of the knife or its width measured between top and bottom edges 324, 325.

In the illustrated arrangement, the top and bottom edges 324, 325 of the knife element are flush with the top and bottom edges of the base plate 309.

The knife element thus generally forms a plate with uniform thickness substantially along its full length such that the planar faces lie in parallel planes.

Each planar face which is on one side of the knife element faces generally in a laterally horizontal direction when the tree removal device 300 is coupled to the front element 77.

The knife element 302 includes a perimeter edge 326 at the blade portion 320 which joins the planar faces 322 about their periphery at the free end 302A of the knife such that the planar faces 322 are contiguous at this perimeter edge. Thus, there is for example no planar portion extending transversely to the respective planar face 322 (e.g., perpendicularly thereto) at a location on the planar face which is along the perimeter edge as this would make the planar faces non-contiguous at the perimeter edge.

In the illustrated arrangement, a portion of the perimeter edge 326 is sharpened along a portion of its length about the blade portion 320 where the blade portion is able to perform a cutting action on tree roots when the working vehicle is operated, that is in this arrangement the working arm 65 is operated so as to move the free end 68A from for example the extended position to the retracted position as the frame of the excavator remains stationary.

The sharpened portion of the perimeter edge includes a forward edge 326A at the distal forward end of the knife element that extends between the top and bottom edges of the knife element 324, 325. In the illustrated arrangement, the forward edge 326A spans from a top tip 328 which is spaced inwardly of the top edge 324 relative to the width of the knife element to a bottom tip 329 located beyond the bottom edge 325 relative to the knife element's width. Also, the perimeter edge's sharpened portion includes a bottom edge 326B extending rearwardly from the tip 329 along a linear path which is parallel to but spaced outwardly of the bottom edge 325 relative to the width of the knife element. Furthermore, the bottom edge 326B which is sharpened extends rearwardly to a back end 331 of the edge 326B which relative to the tip 329 is closer to the rear end of the knife element.

For example, the sharpened portion of the perimeter edge 326 may be formed by for example directly sharpening edges at the blade portion of the polygon-shaped plate forming the knife element. Alternatively, the sharpened portion of the perimeter edge may be formed for example by elongate metal strips sharpened along their length on one side thereof that are then attached by welding to a body of the knife element formed by a rectangular shaped plate.

Thus, in the illustrated second arrangement the perimeter edge follows a piecewise linear path forming three of four sides of a rectangle. In other arrangements (not shown) the perimeter edge may follow for example a circular path or a piecewise linear path forming a blade portion which is rhomboid in shape.

The support post provided in the first arrangement 100 is omitted in the illustrated second arrangement 300 as ranges of movement of the working arm 65 and the front element 77 may in combination provide sufficient manipulation of an orientation of the knife element 302 for slicing tree roots in one or more passes to one side of a tree. Thus, the knife element may be suitably supported in fixed relation at the base frame of the device.

Thus, in use, the tree removal device 300 on the excavator's free end 68A is arranged in a ground engaging position such that the blade portion 320 is inserted into the ground on one side of the tree. Part of this movement of the device 300 into the ground engaging position is likely to include both positioning of the free end 68A at an appropriate height above the ground by operating the working arm 65 and using the front element 77 to orient the knife element at a suitable angle relative to the ground. Of course, operating the front element to position the knife element at the suitable angle comprises pivoting the knife element about the lateral axis at the free end 68A that is oriented transversely to the plane defined by the arm 65.

As such, the knife element is readied for slicing roots in a manner which does not damage them so that the tree is transplantable and which may reduce pulling/tugging on the roots as the knife element is moved through the ground in a cutting action.

After the knife element is in the ground in the ground engaging position, the working vehicle is operated so as to move the knife element in at least one of a forward and backward direction to perform the cutting action with the cutting edge of the knife element, that is the sharpened portion of the perimeter edge 326. In one cutting action the knife element is maintained at a generally constant depth in the ground. Thus, the one cutting action may comprise only movement in one of the forward and backward directions or back-and-forth movement such that the knife element is moved in both the forward and backward directions. At the one side of the tree, a plurality of the cutting actions may be required to completely slice the roots on that side of the tree, and for each subsequent cutting action the blade portion is inserted deeper into the ground. The blade is progressively inserted deeper into the ground so that any time it is the cutting edge of the knife element engaging the non-sliced roots to slice same, and not a blunt edge of the knife element which would act to undesirably pull/tug on the non-sliced roots by which the roots may be damaged. (This is also applicable to the first illustrated arrangement as well.)

In the second illustrated arrangement, moving the knife element so as to perform the cutting action may be achieved primarily by operating the working arm 65 to move same from one of the extended and retracted positions to the other one thereof (when the cutting action is performed in just one of the forward or backward directions) or between the extended and retracted positions (when the cutting action comprises at least one back-and-forth movement). Movement of the knife to perform the cutting action may also include operating the front element 77 to pivot the knife element 302 about the lateral axis at the free end 68A of the working arm, which may for example extend a distance over which the cutting action may be performed in comparison to a cutting action where strictly the working arm is moved from one of the extended and retracted positions to the other one thereof, or therebetween.

Insertion of the knife element at the blade portion deeper into the ground may be achieved by a combination of pivotal movement of the knife element about the lateral axis at the free end 68A, using the front element 77, and lowering the free end 68A towards the surface of the ground, using pivotal movement of the working arm 65 for example about pin 73.

Once a pass is performed on the one side of the tree by the one or more cutting actions, the excavator is repositioned for slicing roots on another side of the tree. This may be achieved by for example rotational movement of the platform 53A about the upstanding axis U to locate the free end with the knife element to another side of the tree without having to move the entire frame 52 of the vehicle using the tracks 56. In some instances, the whole frame 52 of the vehicle has to be moved to suitably locate the free end with the knife element to this another side of the tree. In this manner, subsequent passes are performed about the tree so as to completely slice the tree roots around the full perimeter of the tree (typically passes on adjacent sides of the tree are intersected for this).

The tree with its root ball may then be removed from the ground at its present location and transplanted elsewhere.

It will be appreciated that the base frame may be adapted in a manner so as to allow attachment of the tree removal device 300 to the working arm and front element by a conventional quick attach coupler (not shown).

Alternatively or additionally, in order to be usable by excavators of different sizes the base frame of the second arrangement may be adapted by modifying spacing between the flanges 313 and locations of the apertures in these flanges relative to one another and relative to a base plate of the base frame which determines how the knife element is held in fixed relation to the front element/arm once coupled thereto.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A combination of a working vehicle and a tree removal device configured for coupling thereon such that the combination is arranged for slicing tree roots, the combination comprising:
    the working vehicle having:
        a frame with a forward end along a longitudinal axis of the working vehicle;
        traction components coupled to the frame so as to be configured for moving the working vehicle across a support surface;
        at least one working arm having a first end mounted to the frame and extending from the first end in a direction away from the frame to a free second end of said at least one working arm which is located in spaced relation to the frame;
        a front element pivotally carried on the working arm at or adjacent the free second end thereof such that the front element is spaced from the frame and is pivotally movable relative to the frame about a lateral axis spaced from the frame;
    the tree removal device including:
        an attachment portion including:
            a base frame coupled to the front element of the working vehicle in fixed relation to the front element so that the tree removal device can move with the front element in pivotal movement about the lateral axis; and
            an attachment arrangement on the base frame;
        a knife element carried by the base frame via the attachment arrangement;
        the knife element projecting outwardly from the base frame away from the front element such that a blade portion at or adjacent a free end of the knife element that is usable for slicing the tree roots is held at a position spaced outwardly of the working vehicle frame;
        the blade portion having planar faces on either side facing generally in a laterally horizontal direction;
        the blade portion having a perimeter edge joining the planar faces about their periphery at the free end of the knife element such that the planar faces are contiguous at the perimeter edge with at least a portion of said perimeter edge being sharpened so as to perform a cutting action on the tree roots when the working vehicle is operated.

2. The combination according to claim 1 wherein said at least a portion of the perimeter edge which is sharpened includes a forward edge extending from a position at or adjacent a top of the blade portion to a position at or adjacent a bottom of the blade portion in an upstanding plane transverse to the lateral axis.

3. The combination according to claim 1 wherein the perimeter edge is sharpened along its length so as to be arranged for slicing the tree roots in a plurality of orientations of the blade portion.

4. The combination according to claim 1 wherein said at least a portion of the perimeter edge which is sharpened is free of serrations.

5. The combination according to claim 1 wherein the blade portion of the knife element lies in a flat upstanding plane.

6. The combination according to claim 1 wherein the knife element is arranged for pivotal motion about the longitudinal axis of the working vehicle relative to the base frame about an axis in a vertical plane containing the longitudinal axis of the working vehicle such that the vertical plane divides the working vehicle into symmetrical halves, the knife element being pivotable side to side between a left position and a right position.

7. The combination according to claim 6 wherein the combination further comprises a mechanical actuator arranged for providing the pivotal motion of the knife element between the left and right positions.

8. The combination according to claim 1 wherein the attachment arrangement comprises a support member projecting outwardly from the base frame away from the front element of the working vehicle.

9. The combination according to claim 8 wherein the base frame comprises opposite top and bottom cross members extending laterally of the base frame and two laterally opposite side members spanning between the top and bottom cross members with the support member extending from the bottom cross member upwardly beyond the top cross member.

10. The combination according to claim 8 wherein the support member is supported in fixed position to the base fame relative to the lateral axis such that the support member is movable in fixed relation with the base frame about the lateral axis.

11. The combination according to claim 1 wherein the knife element is supported in fixed position relative to the attachment arrangement.

12. The combination according to claim 1 wherein the attachment arrangement includes a receptacle receiving the knife element therein such that knife elements having different shapes of blade portions are interchangeable on the support member.

13. The combination according to claim 12 wherein the receptacle is formed by a pair of parallel plates which are at spaced positions of one another with respect to the lateral axis.

14. The combination according to claim 12 wherein the knife element is held in butting engagement with a closed bottom of the receptacle.

15. The combination according to claim 1 wherein the base frame is planar and oriented laterally to the working vehicle.

16. A method of slicing roots of a tree in the ground in a manner such that the tree is transplantable comprising:
 providing a working vehicle including:
  a frame with a forward end along a longitudinal axis of the working vehicle;
  traction components coupled to the frame so as to be configured for moving the vehicle in forward and backward directions;
  at least one working arm having a first end mounted to the frame and extending outwardly from the first end in a direction away from the frame to a free second end of said at least one working arm which is located in spaced relation to the frame; and
  a front element pivotally carried on the working arm at or adjacent the free second end thereof such that the front element is spaced from the frame and is pivotally movable relative to the frame about a lateral axis spaced from the frame;
 providing a tree removal device which is configured for coupling to the front element of the working vehicle including:
  an attachment portion configured for coupling to the front element of the working vehicle in fixed relation to the front element so that the tree removal device can move with the front element in pivotal movement about the lateral axis;
  a knife element carried on the attachment portion and projecting therefrom such that a blade portion at a free end of the knife element carrying a cutting edge for slicing the tree roots is held at a position forward of the frame of the working vehicle;
  the knife element being carried so as to lie in a flat upstanding plane;
 with the tree removal device coupled to the working vehicle:
  a) inserting the blade portion of the tree removal device into the ground on one side of the tree where movement of the knife element into a ground engaging position therefor includes pivoting the knife element about said lateral axis using the front element of the working vehicle;
  b) operating the working vehicle so as to move the knife element in at least one of the forward and backward directions to perform with the cutting edge of the knife element a cutting action in said at least one of the forward and backward directions for slicing the tree roots disposed on said side of the tree thereby forming a pass on said side of the tree;
  c) repositioning the working vehicle to another side of the tree for repeating steps a) and b) so as to form a plurality of the passes about the tree to completely slice the tree roots such that the tree is removable from the ground in a condition where the tree is transplantable.

17. The method according to claim 16 wherein, in step b), operating the working vehicle comprises moving the frame of the working vehicle using its traction components in at least one of the forward and backward directions so as to perform the cutting action in the respective direction of movement.

18. The method according to claim 16 wherein the working arm of the vehicle is configured for movement between a retracted position in which the free end of the working arm is in proximity to the frame of the vehicle and an extended position in which the free end of the working arm is located further outwardly of the frame than in the retracted position, and wherein, in step b), operating the working vehicle comprises moving the working arm from one of the retracted position and the extended position to the other one of the retracted and extended positions so as to perform the cutting action in said at least one of the forward and backward directions.

19. The method according to claim 16 wherein each pass comprises a plurality of cutting actions including progressively inserting the blade portion deeper into the ground.

20. A combination of a working vehicle and a tree removal device configured for coupling thereon such that the combination is arranged for slicing tree roots, the combination comprising:
 the working vehicle having:
  a frame with a forward end along a longitudinal axis of the working vehicle;
  the frame forming a peripheral boundary of the vehicle that includes the forward end;
  traction components coupled to the frame so as to be configured for moving the working vehicle across a support surface;
  at least one working arm mounted to the frame and extending beyond the peripheral boundary thereof such that a free end of said at least one working arm is located in spaced relation to the frame;
  a front element pivotally carried on the working arm at or adjacent the free end thereof such that the front element is pivotally movable relative to the frame about a lateral axis spaced from the frame;
 the tree removal device including:
  an attachment portion including:
   a base frame coupled to the front element of the working vehicle in fixed relation thereto; and
   an attachment arrangement on the base frame;

a knife element carried by the base frame via the attachment arrangement;

the knife element projecting outwardly from the base frame away from the front element such that a blade portion at or adjacent a free end of the knife element that is usable for slicing the tree roots is held at a position spaced outwardly of the working vehicle frame;

the blade portion having planar faces on either side facing generally in a laterally horizontal direction;

the blade portion having a perimeter edge joining the planar faces about their periphery at the free end of the knife element such that the planar faces are contiguous at the perimeter edge with at least a portion of said perimeter edge being sharpened so as to perform a cutting action on the tree roots when the working vehicle is operated;

wherein said at least a portion of the perimeter edge which is sharpened is free of serrations.

21. A combination of a working vehicle and a tree removal device configured for coupling thereon such that the combination is arranged for slicing tree roots, the combination comprising:

the working vehicle having:

a frame with a forward end along a longitudinal axis of the working vehicle;

traction components coupled to the frame so as to be configured for moving the working vehicle across a support surface;

a working arm arranged for folding movement having first and second sections which are pivotally coupled so as to be pivotally movable relative to one another about a lateral axis with a lower end of the first section pivotally mounted to the frame, the working arm extending therefrom to an upper end of the first section which is pivotally coupled to an upper end of the second section, and the second section extending from the upper end thereof to a lower end of the second section located in horizontally spaced relation to the frame;

a front element pivotally carried on the working arm at a location along the working arm that is closer to the lower end of the second section than to the lower end of the first section such that the front element is pivotally movable relative to the frame about a lateral axis spaced from the frame;

the tree removal device including:

an attachment portion including:

a base frame coupled to the front element of the working vehicle in fixed relation to the front element so that the tree removal device can move with the front element in pivotal movement about the lateral axis; and an attachment arrangement on the base frame;

a knife element carried by the base frame via the attachment arrangement;

the knife element projecting outwardly from the base frame away from the front element such that a blade portion at or adjacent a free end of the knife element that is usable for slicing the tree roots is held at a position spaced outwardly of the working vehicle frame;

the blade portion having planar faces on either side facing generally in a laterally horizontal direction;

the blade portion having a perimeter edge joining the planar faces about their periphery at the free end of the knife element such that the planar faces are contiguous at the perimeter edge with at least a portion of said perimeter edge being sharpened so as to perform a cutting action on the tree roots when the working vehicle is operated.

* * * * *